United States Patent [19]

Kahn et al.

[11] Patent Number: 4,866,635
[45] Date of Patent: Sep. 12, 1989

[54] DOMAIN INDEPENDENT SHELL FOR BUILDING A DIAGNOSTIC EXPERT SYSTEM

[75] Inventors: Gary S. Kahn, Pittsburgh; Jeffrey A. Pepper, Verona; Al N. Kepner; William Richer, both of Pittsburgh, all of Pa.; Rajiv Enand, Deerborn, Mich.

[73] Assignee: Carnegie Group Inc., Pittsburgh, Pa.

[21] Appl. No.: 110,312

[22] Filed: Oct. 19, 1987

[51] Int. Cl.⁴ .............................. G06F 15/18
[52] U.S. Cl. ............................ 364/513; 364/200; 364/274.5; 364/275.7; 364/900; 364/972.3
[58] Field of Search ........ 364/513, 300, 200 MS File, 364/900 MS File; 382/14, 15

[56] References Cited

U.S. PATENT DOCUMENTS

| | | | |
|---|---|---|---|
| 4,591,983 | 5/1986 | Bennett et al. | 364/403 |
| 4,648,044 | 3/1987 | Hardy et al. | 364/513 |
| 4,658,370 | 4/1987 | Erman et al. | 364/513 |
| 4,670,848 | 6/1987 | Schramm | 364/900 |
| 4,675,829 | 6/1987 | Clemenson | 364/513 |

OTHER PUBLICATIONS

William J. Clancy, "From Guidon to Neomycin and Heracles in Twenty Short Lessons: ORN Final Report 1979-1985", The AI Magazine 8/86, pp. 40-60.
Timothy F. Thompson et al., "A Qualitative Modeling Shell for Process Diagnosis", 1986 IEEE Software, pp. 6-15.
Tom Bylander, "CRSL: A Language for Classificatory Problem Solving and Uncertainty Handling", The AI Magazine 8/86, pp. 66-77.
M. Hofmann et al., "Building Expert Systems for Repair Domains", Expert Systems, 1/86, vol. 3, No. 1, pp. 4-11.
Jeff Yung-Choa Pan et al., "Pies: A Engineer's Do-It-Yourself Knowledge System for Interpretation of Parametric Test Data", AI Magazine, Fall, 1986, pp. 62-69.

Primary Examiner—Joseph Ruggiero
Attorney, Agent, or Firm—Kirkpatrick & Lockhart

[57] ABSTRACT

An application shell provides a domain independent diagnostic problem solver comprised of a knowledge base. The knowledge base includes a plurality of failure mode schemata arranged in a causal hierarchy from observable failure modes to failure modes having a repair procedure; a plurality of rule schemata related to certain of said failure mode schemata; a plurality of datum schemata for gathering data about the system under investigation, the information being used to determine the applicability of said rule schemata; and a plurality of repair procedure schemata each being related to one of the failure mode schemata having a repair procedure. A problem solver is capable of forward chaining through the knowledge base and backward chaining through the failure mode schemata based on the rules, the forward chaining, and the hierarchical arrangement of failure mode schemata so as to change the focus from one failure mode schema to another failure mode schema deeper within the hierarchical arrangement without having to focus upon any intermediate schemata to thereby locate an appropriate repair procedure schema.

21 Claims, 3 Drawing Sheets

DOMAIN INDEPENDENT SHELL FOR BUILDING A DIAGNOSTIC EXPERT SYSTEM

BACKGROUND OF THE INVENTION

1. Field of the Invention

The present invention is directed generally to diagnostic systems and more particularly to a domain independent shell that can be used for building a diagnostic expert system.

2. Description of the Prior Art

Expert systems have been used for a number of years as a substitute for, or adjunct to, human expertise. Expert systems such as MYCIN, EMYCIN and NEOMYCIN have been developed which are capable of carrying on a dialogue for the purpose of diagnosing a medical problem. Studies of expert systems such as NEOMYCIN have lead to the conclusion that the methodology by which a diagnosis is reached can be generalized, or separated, from the domain in which that methodology operates. The generalization of NEOMYCIN has lead to the development of HERACLES. For a discussion of that development see "From Guidon to NEOMYCIN and HERACLES in Twenty Short Lessons; ORN Final Report 1979-1985" by William J. Clancey appearing in the AI Magazine, August, 1986, beginning at page 40.

HERACLES can be said to be a domain independent shell which can be used for building diagnostic expert systems. It is said to be domain independent because it contains no information regarding the domain in which the diagnostic system will operate. It does, however, provide a framework for capturing knowledge about the domain so that the diagnostic strategy built into the system can be applied to the domain. CASTER is an example of a diagnostic system built using HERACLES. CASTER is an expert system capable of diagnosing problems in a metal working process known as sand casting which is used to make metal objects such as wrenches, engine blocks, ocean liner propellers, etc. See "A Qualitative Modeling Shell For Process Diagnosis" by Timothy F. Thompson, et al. appearing in IEEE software, 1966, beginning at page 6.

HERACLES is not the only domain independent shell that can be used to develope a diagnostic expert system. CRSL is an example. See "CRSL; A Language For Classificatory Problem Solving and Uncertainty Handling" by Tom Bylander et al., the AI Magazine, August 1986, beginning at page 66. See also "Building Expert Systems for Repair Domain" by M. Hofmann, et al., Expert Systems, January 1986, Volume 3, No. 1 beginning at page 4. Such domain independent shells, as can be seen from an examination of CASTER, provide for the development of a diagnostic system into a particular domain in a much shorter period of time than what would otherwise be necessary. Of course, the advantage of having such a diagnostic expert system is that less skilled employees can perform trouble shooting or maintenance operations here-to-for only capable of being performed by experts in that particular domain.

Many diagnostic expert systems have been built over the last several years. Typically, the systems use either evidential or causal reasoning. Most evidential reasoning systems, such as EMYCIN are rule based. Each rule represents a belief association between evidential considerations and a conclusion warranted by the evidence. There may be many rules bearing on the same conclusion. A numeric algorithm may be used to compose evidence provided by each applicable rule. A simple decision rule is used to identify the best or most warranted conclusion. Causal systems, and more recently the qualitative reasoning models, operate on the basis of an underlying model of entities and the explicit representation of causal, behavioral, and/or structural relations. Those models are used either to support differential diagnosis, or in the case of qualitative reasoning, a simulative approach to diagnosis.

While the evidential and causal reasoning approaches have proved quite effective within certain domains, none has proved ideal for trouble-shooting tasks, such as machine fault diagnosis. The approach taken by HERACLES has some inherent shortcomings in the trouble shooting environment. First, trouble shooting expertise is less a matter of generating beliefs on the basis of observed symptoms then of using observations as they become known to effectively guide one to conclusive tests. Thus, the simple representational semantics of evidential belief rules typically do not correspond to the way experts think about diagnosing failure modes. Secondly, the backward chaining control strategy provided within this paradigm does not easily allow systems to modify the order in which candidate failures are considered as new evidence bearing on expected likelihoods has accumulated. This can be extremely time consuming when the analysis is prevented from skipping to, or focusing on, a more likely failure but rather must exhaustively examine each failure in the hierarchy until that more likely candidate is reached. Finally, pure rule-based approaches tend to require exhaustive searching. That is impractical for many trouble shooting tasks where there are a large number of problems which could explain any failure mode. As the rule base becomes larger and larger, the time required for such exhaustive searching becomes unreasonable.

Problem solvers which rely on causal models to support differential diagnosis or simulations typically run into three problems when used to reason about machine faults. The first occurs during development as the task of constructing large complex models becomes bogged down in complexity and issues of behavioral validation. The second occurs at run time as these techniques typically result in inadequate performance. Finally, attempts to improve performance through the use of domain-specific heuristics often stumble, as the representational and control constraints of such problem solvers are too rigid to allow such extensions.

Prior art systems are also incapable of addressing the problem of having a single data base represent, for example, various models of a single piece of equipment. In many of the prior art systems, because the knowledge base is so rigidly constructed, it is difficult to make changes without fully appreciating how those changes may affect other portions of the data base. Therefore, it becomes necessary to construct a separate data base for the various different models involved.

Another shortcoming of the prior art is that many available diagnostic systems do no more than suggest a repair for a failure. Many systems provide no means for verifying that the repair was successful, on what level it was successful, or what other repair procedures might prove successful. There is thus a need for a domain independent shell capable of building a diagnostic expert system addressing such shortcomings.

SUMMARY OF THE PRESENT INVENTION

The present invention in its broadest form is directed to a domain independent application shell capable of being used to construct a diagnostic expert problem solver. The application shell is comprised of a knowledge base including a plurality of failure mode schemata arranged in a causal hierarchy from observable failure modes to failure modes having a repair procedure. A plurality of rules is related to certain of the failure mode schemata. A plurality of datum schemata are provided for gathering data about the system under investigation. The data is used to determine the applicability of the rules. A plurality of repair procedure schemata are provided with each being related to one of said failure mode schemata having a repair procedure. A problem solver is provided for searching through the failure mode schemata based on the rules and the hierarchical arrangement of the failure mode schemata in such a manner as to be able to skip to another failure mode schema deeper within the hierarchical arrangement without investigating intermediate schemata to thereby locate an appropriate repair procedure schema. It is thus an object of the present invention to provide a system capable of focusing on the most likely cause of the failure without having to fully examine any intermediate causes.

It is an object of the present invention to provide a system having the ability to deal with incomplete information and modified information. The system can accept information in whatever sequence it becomes available such that the user is not restricted to a fixed order of questions. Should a piece of information be received out of sequence, the system can none-the-less accept the information, make changes and modify all conclusions affected by it. This enables the system to skip to more likely causes of the failure without being locked into a specific path to arrive at the examination of that suspected failure.

It is an object of the present invention to enable inexperienced technicians to follow the instructions "blindly" and arrive at a correct diagnosis, while highly skilled users can use the system as an expert advisor and, if desirable, volunteer additional information that the system uses to arrive at a solution faster.

It is also an object of the present invention to provide a maintainable knowledge base. The knowledge base is easy to maintain because the underlying representations of data are more meaningful than that supported by conventional technologies.

It is an object of the present invention to provide a knowledge base having a well defined structure for representing diagnostic knowledge. The data structures and knowledge base are independent of domain-specific use to allow knowledge bases to change and grow without impact on the system software.

It is another object of the present invention to provide a data base structured such that additional information about new models can be added thereby obviating the need to create a separate data base. In this manner, one data base may be used to cover a variety of models.

It is another object of the present invention to provide a system which does not assume that the problems initially reported are necessarily the result of a single root cause. The system uses heuristic techniques for determining when co-occurring failures can be traced to the same cause.

It is further object of the present invention to provide a system capable of identifying a set of suspected causes from reported symptoms and failure modes and generate a plan for further diagnostic tests which can lead to identification of the failed component or another root cause.

It is a further object of the present invention to provide a mechanism for monitoring the system's own behavior so as to provide explanations of how conclusions were achieved and why questions were asked.

It is a further object of the present invention to provide interactive problem identification and interactive diagnosis. The system is intended to initiate a dialogue with the user, obtain information about the object to identify it and to identify the observed problems to be diagnosed.

It is a further object of the present invention to provide a system having the ability to directly obtain data through physical links to the unit under test and the ability to rapidly access large data bases containing stored documentation on repairs and tests.

It is a further object of the present invention to provide a system wherein the focus can be shifted to a different problem at any point in the diagnosis at the direction of the user.

It is a further object of the present invention to provide direction to the user for repairing all related failures, and determining whether the repair process was successful in eliminating the problem. The present invention also modifies the state of all other reported problems which have been impacted by the repair.

It is a further object of the present invention to provide a system which can be used to produce results that are comparable to the level of human expertise represented in it.

These and other advantages and benefits of the present invention will become apparent from the Description of a Preferred Embodiment hereinbelow.

BRIEF DESCRIPTION OF THE DRAWINGS

In order that the present invention maybe easily understood and readily practiced, a preferred embodiment will be described, by way of example only, with reference to the figures wherein.

DESCRIPTION OF A PREFERRED EMBODIMENT

I. System Overview
  A. Introduction
  B. System Architecture
  C. Knowledge Base
  D. Problem Solver
  E. Rules
II. Detailed System Description
  A. Knowledge Base
    A.1 Category A.2 Failure Modes
A.3 Concern Failure Modes
A.4 Functional-failure-mode and Component-failure-mode
A.5 Failure-mode-class
A.6 Decision mode
A.7 Datum (Tests and Questions)
A.8 Test-procedure
A.9 Test-family
A.10 Repair-procedure
A.11 Rules
   A.11.1 Where to use a Rule
   A.11.2 What a Rule Does
   A.11.3 Control Over Rule Firing
   A.11.3 Details of Rule Schema
   A.11.4 Details of Rule Schema
   A.11.5 More on How Reorder Rules Work
A.12 KB-setup
A.13 Data Function
B. Problem Solver (Diagnosis)
B.1 Decision Nodes
C. Repair
   C.1 Relationship Between Diagnosis and Repair
   C.2 Repair Implementation
      C.2.1 Repair Modules
      C.2.2 Description of Repair Modules
   C.3 Determining Repair Results
   C.4 Default Behavior
   C.5 Modifying Default Behavior
   C.6 Multiple Repair Procedures
D. Other Servers
   D.1 Plan
   D.2 Explanation
   D.3 New Information
   D.4 Undo
E. Conclusion

I. SYSTEM OVERVIEW

A. Introduction

The present invention is directed to a domain independent shell that can be used for building a diagnostic expert system. The present invention can be referred to as a trouble shooting expert system tool (TEST) which is an application shell that provides a domain independent diagnostic problem solver together with a library of schemata prototypes. Those prototypes constitute the object types and the structure required by each domain specific TEST knowledge base. TEST is currently being implemented in Knowledge Craft ™ and LISP.

TEST fills a design nitch halfway between rule-based and causal-model approaches. On the one hand, TEST uses a weak causal model to describe causal links between failure modes, and on the other hand, uses rules to constrain and direct diagnostic reasoning. TEST provides a more differentiated knowledge base and a more powerful set of control and inference options than are currently available in other expert system tools.

TEST's approach has resulted in a design that meets several functional requirements for an effective troubleshooting shell. TEST can represent the impact of failure modes on a machine or system of interest as well as the heuristic problem-solving behavior which can lead to more rapid conclusions. The underlying representation and the problem solving method are easily understood by both design engineers and diagnostic technicians. Systems built in TEST are more easily maintained than those built using rule-based structures.

B. System Architecture

Figure 1:
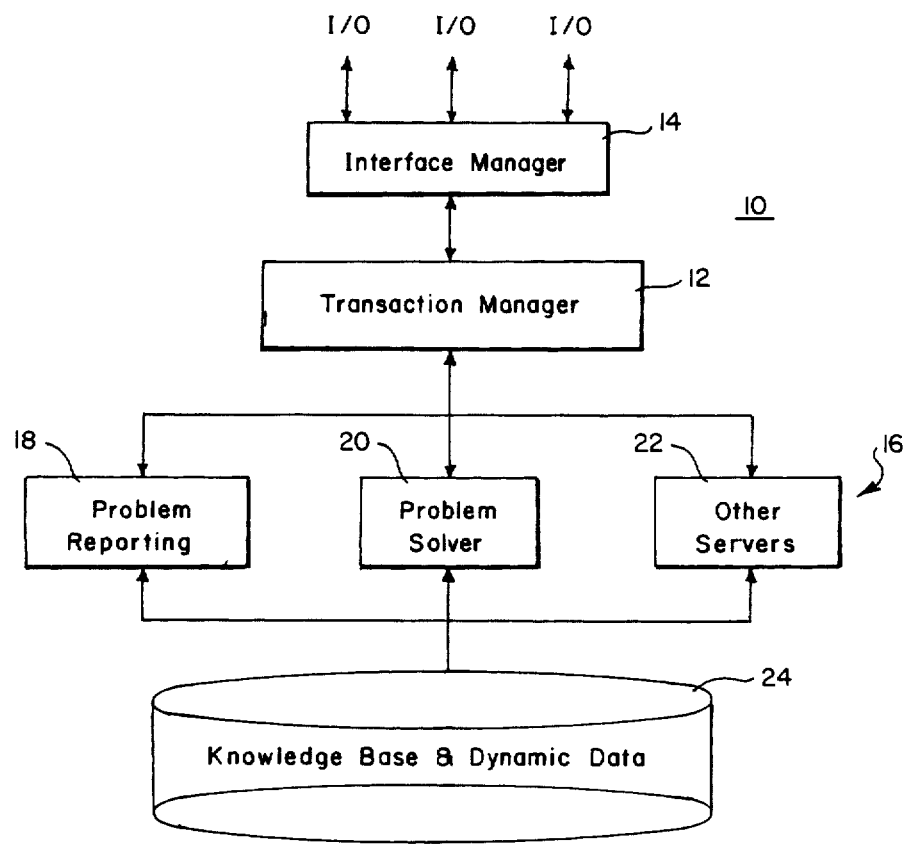
FIG. 1 illustrates the system architecture of a domain independent shell constructed according to the teachings of the present invention.

The TEST system 10 illustrated in FIG. 1 is a modular, transaction-driven system. A transaction manager 12 is responsible for maintaining the overall state of the system 10. An interface manager 14 provides a device-independent input/output interface. The interface manager 14 translates a request for input/output from various I/O devices (not shown) into a request which is input to the transaction manager 12. The interface manager 14 can be used to accommodate alternate sources of input, such as data base or data acquisition devices, without impacting on the remainder of the system 10.

The transaction manager 12 is responsible for directing all input/output requests between a number of server modules 16 and the interface manager 14, and for invoking various server modules 16 as required to respond to user requests. Input requests received from server modules are processed on a stack (not shown). That enables the system 10 to service any new requests before completing the current activity. Output requests from server modules 16 are processed on a queue (not shown) which is held and flushed only when an input request is posted. That minimizes interruptions to execution.

The server modules 16 are the modules which actually preform TEST's functions. Each module is independent of the others and of the transaction manager 12, although data may be shared. Server modules 16 are responsible for interrupting themselves to request I/O from the transaction manager 12, and they are responsible for maintaining execution state information as required to insure that processing continues upon return from the interrupt.

A problem reporting server 18 is the module which conducts the initial dialogue with the user to identify top-level failures.

A problem solver 20 is the heart of the TEST system. This is the server which executes the diagnosis and repair. The strategy used by problem solver 20 is a highbred one, using backward chaining to drive the diagnosis and forward chaining to reach conclusions about the occurrence of failure-modes as soon as relevant data becomes available. The problem solver 20 is an important feature of the present invention and is described in more detail in sections ID and IIB hereinbelow.

Various other servers 22 may be provided. A planner server may be engaged in a hypothetical diagnosis to provide the user with a set of failures and tests to be investigated to proceed forward in the current diagnosis. A backup server returns the diagnosis to a point before the most recent test, undoing all the changes made as a result of that test. The undo server allows the user to specify a test at any point in the diagnosis which is to be undone. The user may request that only this test result should be changed, or may request that all test be undone chronologically proceeding backward from the current test to the specific test. A new-info server may be used to allow the user to assert something about the knowledge base, usually to confirm/disconfirm a failure. An explain server uses information maintained by the problem solver about the diagnosis to describe the justification for its current beliefs. A help server gives information on how to use the system. A mail server stores a comment from the user for the knowledge engineers. A documentation server displays information on how to perform a test or repair. That information may be accessed from a separate data base. The various other servers are described in detail in Section IID.

The servers operate on a knowledge base and dynamic data 24 illustrated in FIG. 1. The knowledge base consists of a large number of information structures called schemata. Each schemata represents some chunk of knowledge about the domain. The schemata are connected to each other with a rich network of links called relations which define how one schemata relates to another. The knowledge base 24 is passive in that it does not actually do any processing by itself. It is the manipulation of the knowledge base 24 by the various servers 16 which enables conclusions to be drawn.

The knowledge base 24 consists of a static and a dynamic portion. The static portion of the knowledge base 24 includes the failure mode hierarchies, tests, repairs, and rules. The static portion also includes interface and knowledge base information directed to a specific user. The static portion is used by the knowledge engineer to capture information about the domain in order to construct a diagnostic problem solver for that domain.

The dynamic portion of the knowledge base consists of the active status of failure modes and test results. In addition, the problem solver 20 saves information that is used to generate explanations and to allow the user to undo the diagnosis. The dynamic data base is thus generated and maintained when the static portion of the data base is being manipulated during a diagnosis. The knowledge base 24 is an important feature of the present invention and is described in more detail herein below in sections IC and IIA.

C. Knowledge Base.

Figure 2:
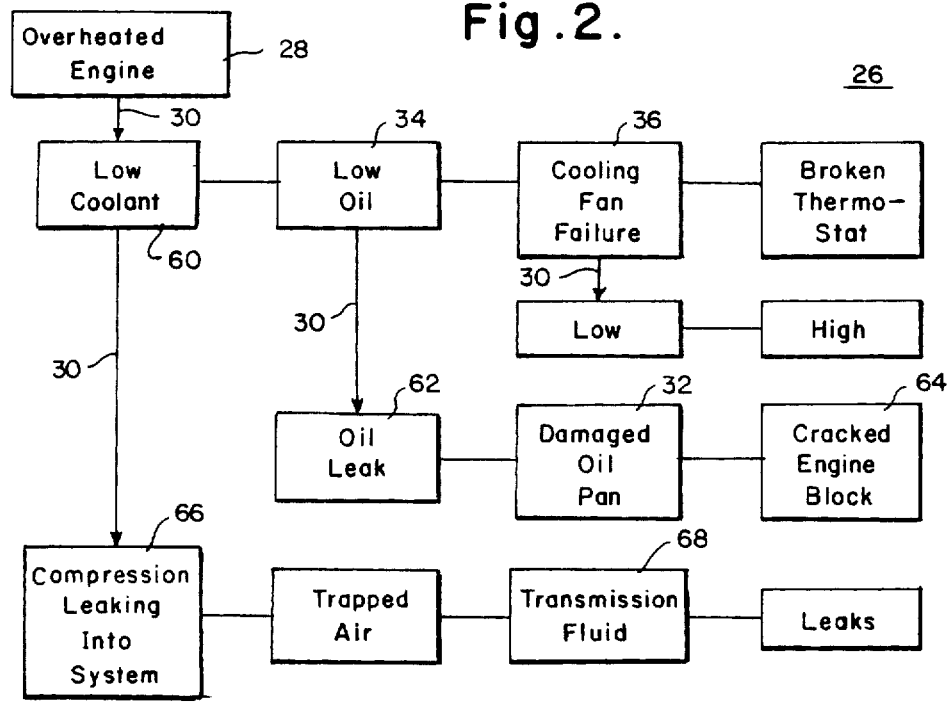
FIG. 2 illustrates a causal hierarchy of failure modes arranged with observable problems at the top to individual component failures at the bottom.

Unlike rule-based diagnostic systems, TEST uses a semantic network of schemata objects, called frames or schemata, to represent its key concepts. Those concepts match those of most troubleshooting technicians and many design engineers. Most critical is the failure-mode. A failure-mode represents a deviation of the unit under test from its standard of correct performance. Failure-modes are arranged in a causal hierarchy 26 shown in FIG. 2. At the top of the hierarchy are observable problems, e.g., an overheated engine 28. Each node is linked to a disjunctive set of its possible causes via a due-to link 30. At the bottom of the hierarchy, as shown, are failure-modes of individual components, e.g. a damaged oil pan 32. Intermediate failure-modes typically represent functional failures which are causal consequences of component failures, e.g., cooling fan failure 36. Many levels of intermediate failure-modes are common. Typical TEST networks may have seven to fourteen levels of concerns. Networks can be used to represent both classificatory hierarchies and causal paths.

Figure 3:
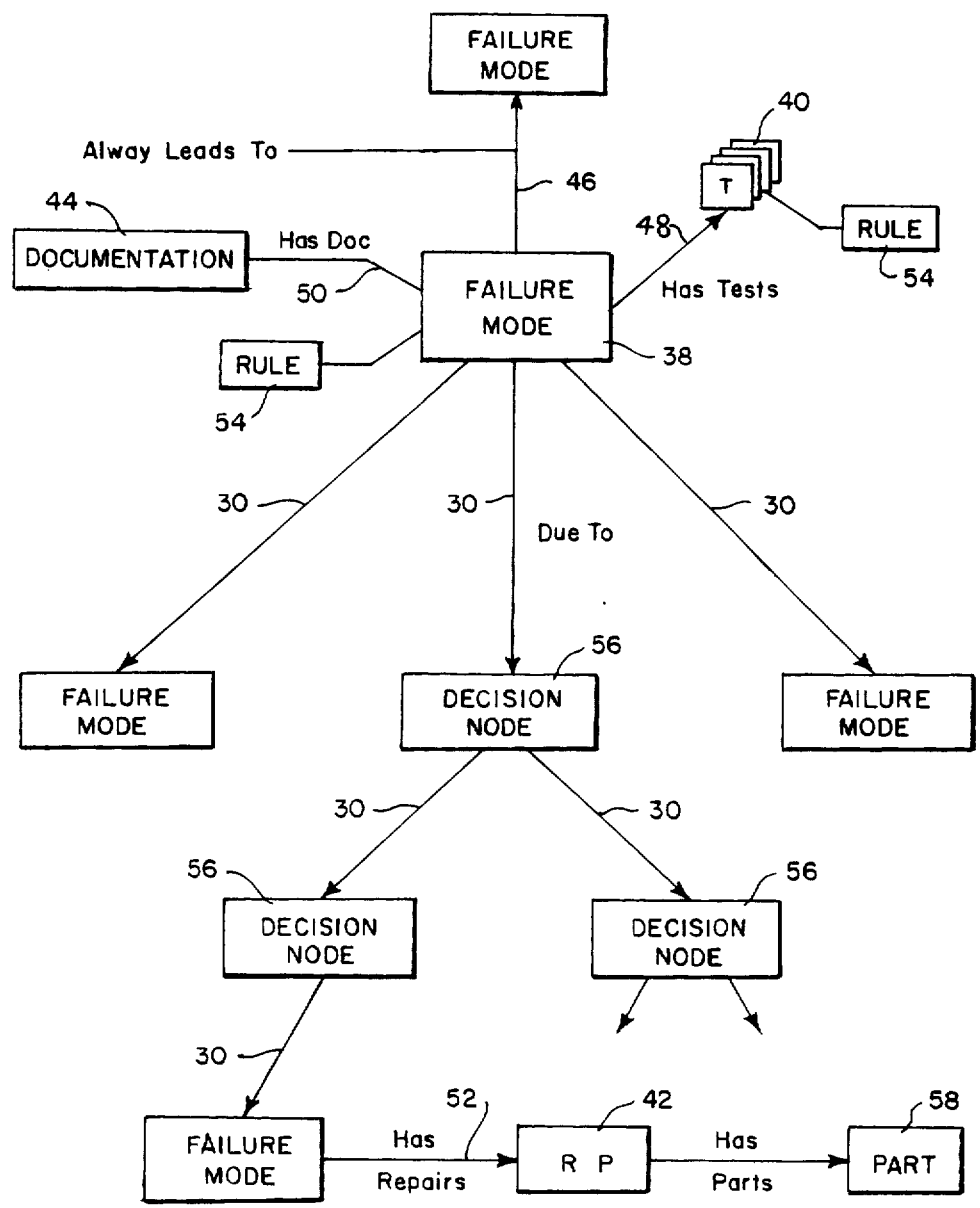
FIG. 3 illustrates how information is clustered around a failure mode.

Knowledge base maintenance is facilitated by clustering information around failure-modes 38 as seen in FIG. 3. Since the failure-mode is the key concept in most troubleshooting tasks, such aggregates provide an easily understood and readily accessible structure. Inspection of a failure-mode provides direct access to associated tests 40, repairs 42 and documentation 44, as well as to the forward causal links "due to" 30 and backward causal links "always leads to" 46 to other failure-modes in the network.

The knowledge base is organized as a network of failure-modes having primary links 30, 46 to other causally related failure-modes and secondary links "has tests" 48, "has documentation" 50, "has repairs" 52, etc. to other knowledge-base objects such as tests 46, documentation 44, and repairs 42, respectively. If multiple links exist between a failure-mode and a class of objects (for example, a failure-mode which can be due-to any of a number of other failure-modes), the ordering of the links is determined by the order of multiple values in a single schema slot. This ordering is critical to the behavior of the diagnostic problem solver 20, as discussed below.

Failure-modes can be confirmed or rejected as information becomes known. The recognition of other failure-modes, or the results of tests 40, including both user queries and direct sensor-based sampling, can lead to diagnostic conclusions. Tests 40 are distinct nodes in the network. Other conceptual objects within TEST include test-procedures (not shown), repair-procedures 42, rules 54, decision-nodes 56, and parts 58, among others. Each of these concepts is mapped into the troubleshooting domain.

Test-procedures (not shown) describe sequences of tests, each of which must be carried out before the diagnostic significance of the overall procedure can be evaluated. Repair-procedures 42 describe corrective actions to pursue upon determining the occurrence of a failure-mode. Rules 54 represent a variety of contingent actions rather than evidence/belief propositions alone, as is typical in MYCIN-like diagnostic systems. TEST's use of rules is described in sections IE and IIA. Parts 58 provide descriptors of parts that are associated with component failures or with repairs 42.

Decision-nodes 56 provide a mechanism for integrating conventional diagnostic decision logic into the otherwise failure-mode oriented knowledge base. Although TEST can generate its own decision logic from the failure-mode knowledge base, domain experts often prefer to provide the decision logic directly. This may be done by building a decision-node 56 network. Each decision-node 56 represents a test together with a branch to another test contingent on the result of the first. A decision-node network typically terminates with the identification of a failure-mode.

D. Problem Solver

The domain-specific knowledge base 24 serves as input to the problem solver 20. Given the failure-mode hierarchy and other auxiliary information, the problem solver searches for a diagnostic conclusion, interactively prompting a technician, or sampling sensors or databases, as necessary to obtain evidence to proceed with the diagnostic session.

In general terms, the problem solver 20 pursues a depth first recursive strategy starting with an observed or determined failure. It seeks the cause of an occurring failure-mode by sequentially considering, from left to right, candidate causes (other failure-modes) referenced in the due-to slot 30 of the failure-mode under consideration. Candidate causes can have three states: confirmed, disconfirmed, and unknown.

If a candidate cause is disconfirmed, the problem solver 20 moves on to the next sibling candidate. If a candidate cause is confirmed, the problem solver takes it as its new focus and attempts to determine the cause of this new failure in the same way, by examining the causes referenced in its due-to slot 30. If a candidate cause is unknown (because the problem solver 20 is unable to determine its truth value), the problem solver 20 focuses on the failure-modes in its due-to list. If a deeper cause is found it becomes the new diagnostic focus. If no deeper cause is found it backs up and goes on to the next sibling of the unknown failure-mode. This procedure continues until a terminal failure-mode is identified. Terminal failures, those without instantiated due-to slots, are typically repairable faults.

Returning to FIG. 2, the problem solver 20 would first consider low coolant 60 as the cause of an overheated engine 28. If this were ruled out, it would proceed to consider low oil 34. If a test associated with this failure-mode confirmed that the oil was low, the problem solver would proceed to consider the causes of low oil: oil leak 62, damaged oil pan 32, and a cracked engine block 64.

As new failure-modes come up for consideration, the problem solver 20 chooses a method of confirmation provided by the knowledge base developer. It may be a direct test, a rule-based inference procedure, or the disconfirmatory recognition (modus tollens) that a necessary consequent of the failure-mode had not occurred. If the failure-mode can be neither confirmed or disconfirmed, the problem solver 20 will nevertheless proceed to examine potential causes. If a failure-mode can have multiple causes, the diagnostic analysis will not terminate until all potential candidate causes are evaluated.

On each cycle, as new information is collected, the problem solver 20 updates data driven rules that monitor for co-occurring conditions that would lead to the immediate recognition of a failure-mode or to a change in its diagnostic focus.

The failure-mode hierarchy communicates much more than a simple network of causal relations. In particular, the structure is one that is easily manipulated by knowledge engineers in order to keep diagnostic sessions effectively focused. For instance, failure-modes are typically ordered from most to least likely. However, ordering can be used to represent the outcome of complex tradeoffs involving the cost of a test, likelihood of occurrence, and availability of a repair. Knowledge engineers can also choose the appropriate level of granularity for the representation of causal chains, thus constraining the depth of search required prior to hypothesizing a particular failure. While the failure-mode hierarchy represents a precompiled search space, the search space can be dynamically altered by rules sensitive to information acquired during a diagnostic session.

Apart from the failure-mode hierarchy, the problem solver 20 may also be driven by decision-nodes 56 and data gathering activities. TEST's ability to integrate test and failure mode driven diagnosis is critical to knowledge acquisition as both approaches are typically prevalent in the procedures used by technicians and referenced by manuals.

Data gathering activities could be used to interrupt the problem solver's transition between candidate failure-modes. In essence, this allows new information to be acquired and considered before the problem solver commits to focusing on a new candidate. Another kind of data gathering activity is invoked when tests should be run as a matter of convenience rather than for immediate diagnostic purposes. For instance, if dismantling is required for a particular test, it may be desirable to run other tests that require similar dismantling before reassembly, even though the latter tests are not of immediate relevance.

TEST additionally allows users to volunteer unsolicited information, as well as to dynamically change the course of the diagnosis. Since troubleshooting systems tend to be highly interactive, it is desirable to take advantage of user input, particularly the human ability to notice diagnostically critical information, even though the system may not be asking for it. Moreover, the hunches of experienced technicians can often prove valuable in reducing diagnostic search time. By utilizing these hunches, TEST not only makes use of its human partners but is perceived as being more user friendly and less frustrating to use.

Finally, the problem solver maintains a belief maintenance system that is used to support the undo server which provides the ability to selectively modify any prior input. The impact of a modification is propagated through the belief system, possibly resulting in a change of diagnostic focus.

E. Rules

Rules are conditional expressions of the form "IF (condition) THEN (action)." The condition is a boolean combination of (schema, slot, value) triples which represent a piece of information in the knowledge base. The various types of rules identified in this section operate by changing or reordering values for a (schema, slot) tuple as described more fully in Section II A.11.

TEST allows knowledge-base developers to characterize four types of dynamic alterations to a default knowledge base. Derivational rules are used to recognize when failure-modes may be confirmed or ruled-out, as well as to infer factual data. Causal modeling rules are used to dynamically alter the failure-mode hierarchy. For instance, in FIG. 2, when low coolant 60 is under consideration for a reason other than an overheated engine 28, compression leaks 66 and transmission leaks 68 are not considered as plausible causes and can be removed from the due-to slot of low coolant 60. These rules are also used to express conjunctive causes. That is, a failure-mode can be added to a due-to list only under the condition that another failure-mode had been determined to occur.

Procedural rules are used to modify the several kinds of procedural and methodological knowledge that may been represented in a TEST knowledge base. As discussed above, the order of mention in a due-to slot indicates the order in which the diagnostic problem solver 20 is required to consider potential causes of a failure-mode. Background information acquired during execution may suggest altering the order to more closely reflect conditional likelihoods of each failure-mode. By moving the most likely, given the new information, to the font of the list, the problem solver 20 is more likely to reach an early conclusion. A rule would be used, for instance, to indicate that low oil 34 should be considered prior to low coolant 60 as a cause of overheating 28 when the engine is making a tapping sound. In the context of machine diagnosis, such rules provide a mechanism for ensuring that failures due to part wear are investigated first for older machines, but only after manufacturing parts problems in the case of newer machines.

Procedural rules may also be used to alter the choice of tests available to a user when a piece of information is required. For instance, a built-in temperature gauge may be damaged when temperatures are intense. In that case, a special piece of equipment might be used in preference to the built-in gauge. This is easily specified by a TEST rule.

Procedural rules also facilitate the process of modeling conventional decision logic. Rules overlaid on decision-nodes may alter the transition path to a subsequent decision, or respecify which failure-modes are confirmed or disconfirmed as new information is acquired at each decision-node. Thus, TEST permits developers to focuses on the default decision logic without worrying about working atypical alternatives into the network. These are easily added as special case rules.

Finally, relevance rules may be used to filter the knowledge base by deactivating objects. Rules attached to failure-modes, for instance, can remove the failure-mode from consideration during a diagnosis. This feature is used, for example, in multiple model knowledge bases when the component part associated with a failure-mode is not actually used in the model (or manufacturing run) represented by the unit presenting the fault.

Rules may be characterized as immediate or on-focus. Immediate rules act as demons, firing as soon as their conditions are satisfied. On-focus, or goal driven, rules are invoked only when the rule is relevant to the current focus of the problem solver.

II. DETAILED SYSTEM DESCRIPTION

A. Knowledge Base.

The TEST design provides a well-defined structure representing diagnostic knowledge. The following sections discuss in detail the various kinds of schema used in the knowledge base.

A.1 Category

The knowledge base is organized by customer-concerns, the initial problem that the user wants to be solved. Because a typical TEST application deals with many concerns, the knowledge engineer can group the concerns together in categories by means of category schema.

The grouping of concerns into categories is especially important when the number of concerns exceeds the number of icons which can be displayed on the screen at one time. By grouping several concerns into a single category the user is able to select a category from the main concern menu, then select the individual concern(s) from within that category afterwards.

The TEST software will display at the top-level menu all those schemata which are of type category. A schema which is just a category (that is, it's not a concern itself but merely points to a group of lower-level concerns) might look like this:

(defschema CC-suboptimal-performance :parallel
    (instance category)
    (icon-name "suboptimal-performance")
    (has-concerns
        CC-memory-limitations CC-io-limitations
        CC-cpu-limitations))

The slots for category are:

INSTANCE—what type the schema is. This slot must contain the value CATEGORY, as well as possibly the value CONCERN-FAILURE MODE.

HAS-CONCERNS—followed by one or more CONCERN schema names. If the user selects this schema from the top-level menu, he will get a sub-menu containing all the elements from this slot. If the slot has one member, then no sub-menu appears. That one member is confirmed automatically.

ICON-NAME—a short string used for the menu icon

A.2 Failure-modes

A failure-mode is a schema which describes some way that the unit under test is not performing as it was designed to. These functional failures, other than root causes, should always have a DUE-TO list which contains a list of failure-modes that might be the cause for the failure.

As noted earlier, the basic structure of the knowledge base is a hierarchy of failure-modes. Failure-modes are linked to lower-level failure-modes via the DUE-TO relation, and to higher-level failure-modes via the ALWAYS-LEADS-TO relation. These two relations have inverses (DUE-TO+INV and ALWAYS-LEADS-TO+INV, respectively), which also can be used by the problem solver to move from one failure-mode to another.

A typical sequence of failure-modes would start in one of the top-level customer concern failure-modes, and move downward into more and more detail until it enters a certain subsystem, then further downward until a component failure is identified. A number of specific failure-modes may be identified as SUBSYSTEM ENTRY POINTS—these are the ways that a hierarchy of failure-modes moves from general failures that cannot be assigned to a particular subsystem, to more specific failures that are in a particular subsystem. An entry point is defined as a failure-mode that is within a certain subsystem, and which appears in the DUE-TO list of at least one other failure-mode outside that subsystem.

Entry points are important, because they define the way that a subsystem knowledge base interacts with other subsystems and the top level customer concerns.

The entry points to each subsystem are listed at the beginning of the file which contains that subsystem knowledge base.

A failure-mode schema has the following slots:

INSTANCE—what type the schema is. This slot must contain the value FAILURE-MODE. If the schema contains any information you know is wrong, or if you need to return to the schema to fix something later, you should also put the value BOGUS in this slot, and a comment in the COMMENT metaslot explaining the problem.

DESCRIPTION—a brief description of the failure. The value should be a noun phrase.

DUE-TO—a list of other failure-modes that can be the cause of this particular failure or decision nodes. The list is ordered, meaning that the problem solver will consider the first element in the DUE-TO list, then the second and so on. This is an optional slot. The contents of this slot can be modified by rules, which must be listed in the DUE-TO-RULES slot.

This slot can have a meta-schema attached to it, with the following two possible slots:

EXPECT-MULTIPLE-CAUSES—indicates whether the problem solver should look through the DUE-TO list for more than one cause of this failure-mode. Legal values are YES and NO; the default is NO.

DUE-TOS-ARE-EXHAUSTIVE—indicates whether inferences can be based on the assumption that the DUE-TO list contains all possible causes of this failure-mode. If YES, the problem solver will use a rule-out strategy to conclude one failure-mode from the DUE-TO list if it can rule out (disconfirm) all other failure-modes in the DUE-TO list. Legal values are YES AND NO; the default is NO.

DUE-TO-RULES—an optional list of rule schemata which modify the DUE-TO slot. See Section A.11 for more information.

DUE-TO+INV—the inverse of the DUE-TO relation. (System generated)

HAS-REPAIRS—a list of repair-procedure schemata. The list is ordered and the problem solver will recommend the first repair in the list (unless it has already been performed and for some reason did not fix the problem).

HAS-REPAIRS-RULES—optional list of rules schemata that modifies the HAS-REPAIRS slot.

ALWAYS-LEADS-TO—a list of those failure-modes which are always caused by this failure-mode. The problem solver will automatically confirm these failure-modes, if the current failure-mode is confirmed. This is an unordered list. Note: the problem solver will automatically put into this slot the names of all failure-mode-classes that have this failure-mode in their DUE-TO list.

ALWAYS-LEADS-TO-RULES—an optional list of rule schemata which modify the ALWAYS-LEADS-TO slot. See Section A.11 for more information.

ALWAYS-LEADS-TO+INV—the inverse of ALWAYS-LEADS-TO. (System generated)

HAS-TESTS—a list of those tests schemata which can be used to confirm or disconfirm the existence of this failure-mode. This is an ordered list, meaning that the problem solver will try to perform the first test on the list, and if unable will try the second, and so on. It is a disjunctive list, meaning that any of the tests can be used to confirm or disconfirm the failure-mode. The list can be modified by rules.

Remember that the tests in the HAS-TESTS slot, plus the information about confirming and disconfirming results in their metavalues, must be sufficient in themselves to prove the failure-mode, without the assumption that any other tests have been made or any other failure-modes have been confirmed or disconfirmed. The confirmation/disconfirmation of each failure-mode must be independent of the status of other failure-modes in the knowledge base.

Each test listed in this slot can have meta-information attached to it indicating what the confirming or disconfirming test results are. The problem solver compares the actual test results to the specified values for CONFIRMING-RESULTS, and then takes the following action:

1. If the CONFIRMING-RESULTS is satisfied and the DISCONFIRMING-RESULTS is not, then the failure-mode is confirmed (the failure-mode's OCCURS slot is set to YES).

2. If the DISCONFIRMING-RESULTS is satisfied and the CONFIRMING-RESULTS is not, then the failure-mode is disconfirmed (the failure-mode's OCCURS slot is set to NO).

3. If neither the CONFIRMING-RESULTS nor the DISCONFIRMING-RESULTS is satisfied, then the status of the OCCURS slot remains unknown.

4. If both the CONFIRMING RESULTS and the DISCONFIRMING-RESULTS are satisfied, this is an error and represents a knowledge base inconsistency. The CONFIRMING-RESULTS and DISCONFIRMING-RESULTS should be specified in such a way that both cannot be satisfied simultaneously.

The knowledge engineer can explicitly specify either or both of the CONFIRMING-RESULTS and the DISCONFIRMING-RESULTS, or can allow either or both to default, or can explicitly specify that only one of the two is to be used. The following rules govern how the problem solver fills in default values:

1. The default value of CONFIRMING-RESULTS is (EQ YES). This works best in the common case when the POSSIBLE-RESULTS of the test are PASS and FAIL, and FAIL confirms some failure-mode. If you do not wish to have any value for the DISCONFIRMING-RESULTS slot, use the symbol NOT-USED.

2. The default value of DISCONFIRMING-RESULTS is the logical negation of the CONFIRMING-RESULTS. So if CONFIRMING-RESULTS is (EQ YES), DISCONFIRMING-RESULTS is set to (NOT-EQ YES). This means that all possible results for a datum (except UNKNOWN) either explicitly confirm or explicitly disconfirm something (a failure-mode or a step in a test-procedure). If you do not wish to have any value for the CONFIRMING-RESULTS slot, use the symbol NOT-USED. In this case, you must specify a DISCONFIRMING-RESULTS.

It is tempting to think of the HAS-TESTS slot as purely disjunctive—in other words, you might expect that the problem solver will confirm the failure-mode if any of the tests pass. However that is not exactly true. What really happens is that the problem solver steps through the tests in the HAS-TESTS slot until the OCCURS slot of the failure-mode is changed from its original value (usually UNKNOWN), to either YES (if the failure is confirmed) or NO (if it is disconfirmed). Normally this happens as soon as the first test in the HAS-TESTS slot is performed. If you want to use HAS-TESTS as a purely disjunctive slot, you need to attach meta-information to each value in the slot, indicating that the failure-mode should not be disconfirmed if the test passes. For example, this HAS-TESTS slot will be treated as truly disjunctive and the problem solver will try each of the three tests in order, until it finds one which confirms the failure-mode:

(has-tests
  T-1 (:meta nil
    (disconfirming-results not-used))
  T-2 (:meta nil
    (disconfirming-results not-used))
  T-3 (:meta nil
    (disconfirming-results not-used))

HAS-TESTS-RULES—an optional list of rule schemata which modify the HAS-TESTS list. See Section A.11 for more information.

OCCURS—indicates whether the problem solver has confirmed or disconfirmed this failure-mode. This slot should not used by the knowledge engineer, but is reserved for system use. Values are YES, NO, and UNKNOWN; the default is UNKNOWN.

OCCURS-RULES—an optional list of rule schemata which modify the OCCURS slot. See Section A.11 for more information.

DUE-TOS-ALREADY-EXAMINED—this slot should not used by the knowledge engineer, but is reserved for system use.

COMPLETE—this slot should not used by the knowledge engineer, but is reserved for system use.

CONCERN-NAME—used to generate a selectable item in the customer-concern menu that appears in the service writer interface. Only used if the failure-mode is a customer-concern.

NOTE—a string describing any special reason why this failure-mode exists, such as a Technical Service bulletin (TSB). If this slot has a value, the string will be printed out along with a brief message, whenever this failure-mode is confirmed. The message is something like "NOTE": this failure-mode is confirmed because of", and alerts the user to the fact that there is a special reason for this failure-mode to be confirmed.

A.3 Concern-failure-mode

A concern-failure-mode is a failure-mode which happens to be at the top of a failure-mode hierarchy; that is, there are no higher-level failure-modes which are due to it. A concern-failure-mode has all the same slots as a normal failure-mode, plus a special slot called DIAGNOSIS-QUESTIONS. This slot contains a list of all the questions which are asked of the user after he selects this concern. For example, below is a typical concern-failure-mode which has a number of questions associated with it:

```
(defschema CC-machine-wont-start :parallel
    (instance concern-failure-mode)
    (diagnosis-questions)
    Q-1
    Q-2
    Q-3 (:meta nil (conditon (Q-1 results yes)))
    Q-4 (:meta nil (condition (AND (Q-1 results yes)
        (Q-2 results no))))))
    Q-5 (:meta nil (condition (OR Q-1 results no) (Q-2
        results yes))))))
```

This Schema indicates that the concern called CC-machine-wont-start has five question that can be asked, called Q-1 through Q-5. The questions are asked in the order shown, but some of them have preconditions that must be satisfied before they can be asked. Q-1 and Q-2 have no preconditions, and are always asked. Q-3 is only asked if the answer to Q-1 is yes. Q-4 is only asked if the answer to Q-1 is yes and the answer to Q-2 is no. Q-5 is only asked if the answer to Q-1 is no, or if the answer to Q-2 is yes.

The form of the DIAGNOSIS-QUESTIONS slot is:

```
(diagnosis-questions
    question-1 (:meta nil (condition logical-expression-
        1))
    question-2 (:meta nil (condition logical-expression-
        2))
    question-n (:metal nil
    (condition logical-expression-n)))
```

The slot can be empty, or it can have one or more values. Each value corresponds to a datum schema defined elsewhere in the knowledge base. Following each question name is, optionally, a meta-schema containing a logical expression which defines the conditions under which the question is asked.

A logical expression is built up from three-element lists called triples, where each triple consists of a schema-name, a slot-name, and a value. The triple evaluates to yes if the schema whose name appears the triple has the given value in the given slot. More complex logical expressions can be made by combining triples by using the logical operators and, or, and not, For example:

```
(diagnosis-questions
    Q-3 (:meta nil
        (condition
            (AND (OR
                (Q-1 results blue)
                (Q-1 results green))
            (OR
                (Q-2 results blue)
                (Q-2 results green))
            (NOT (Q-1 results black)) ))))
```

In this example, the question Q-3 will be asked if question Q-1 had a result of either blue or green, and Q-2 also had a result of either blue or green and Q-1 had some result other than black.

If the overall logical expression evaluates to yes, the question is asked. If there is no meta-schema attached, the question is always asked; in other words, the logical-expression defaults to yes.

Note that there is one other place in the knowledge base where you can specify a list of questions to be asked at the beginning of a diagnosis: in the SESSION-QUESTIONS and DIAGNOSIS-QUESTIONS slots of the kb-setup schema. This schema is described in more detail in Section A.12

A.4 Functional-failure-mode and Component-failure-mode

You may wish to specify whether a particular failure-mode is a functional failure or a component failure. This distinction between functional and component failures can be made by replacing (instance failure-mode)

with one of the following:

(instance component-failure-mode)

(instance functional-failure-mode)

Since both component-failure-mode and functional-failure-mode have an IS-A relation to failure-mode, the use of these specialized instance values does not affect the meaning of the failure-mode schema that you create—it merely provides more information which may be useful to another knowledge engineer, someone browsing the knowledge base, or possibly some future implementation of the problem solver.

A.5 Failure-mode-class

A failure-mode-class is a special case of a failure-mode used to indicate that the failure-mode is not a component failure or functional failure but exists to group together a number of related failure-modes in a single DUE-TO list. All slots are the same as in the failure-mode description above.

The problem solver does not print conclusion messages when it concludes that a failure-mode-class has been confirmed. This is done in order to avoid confusing the user with possible irrelevant messages.

A.6 Decision-node

A new type of schema called a decision-node has been introduced to handle cases within the diagnosis where conditional branching is desirable, particularly in the area of certain sequences of tests. This conditional branching scheme resembles a traditional programming language such as BASIC, where actions are performed sequentially until a branching condition is satisfied. In this scheme, the primary actions being performed are the asking of questions and prompting for test results. The scheme also enables the knowledge engineer to force the confirmation or disconfirmation of failure-modes when the appropriate conditions are satisfied.

Each decision-node has a single test associated with it, along with a number of possible test results. Each of the results has a meta-schema attached to it describing the actions which are to take place: confirming failure-modes, disconfirming failure-modes, and/or branching to another decision-node. In addition, rules can be attached to these actions, which modify their values depending on information obtained during the diagnosis.

Instances of the decision-node schema can be used in the DUE-TO slot of a failure-mode, where they may be intermixed with failure-modes. The meaning of a decision-node is slightly different from a failure-mode, however. Failure-modes in a DUE-TO list are potential specific causes of the failure-mode schema in which the slot appears. Decision-nodes appearing in a DUE-TO slot can be thought of as entry points into a sequence of other decision-nodes, which eventually will lead to the confirmation of a failure-mode which is the cause of the original failure-mode.

For example, consider the following failure-mode and its DUE-TO list:

(defschema FM-A :parallel (due-to FM-B FM-C DN-D FM-E) ... )

This indicates that failure-mode FM-A is most likely to be caused by FM-B, or FM-C, or some as-yet unspecified failure-mode that can be located by entering a decision-node sequence at decision-node DN-D, or finally FM-E.

The slots in the decision-node schema are:

INSTANCE—what type the schema is. This slot must contain the value DECISION-NODE.

WHY—contains "canned" explanations, used by the explanation facility to describe the meaning of this particular decision-node, e.g. pinpoint test. The value of this slot should be a string.

DESCRIPTION—a brief description of the decision-node. The value of this slot should be a noun phrase.

HAS-TEST—the test to be performed, upon whose results the conditional branching is based.

ALL-BRANCH-TOS—a comprehensive list of all decision-nodes and failure-modes appearing in the schema. The value for this slot is computed automatically by the problem solver and is not to be entered by the knowledger engineer.

ALL-BRANCH-TOS+INV—the inverse link of ALL-BRANCH-TOS, indicating which other decision-nodes branch to this one. (System generated)

RESULT-ACTIONS—a list of possible results of the test.

Each of the slot values must have a meta-schema attached to it, describing the actions to be performed if this result-spec is satisfied. The problem solver steps through each value in the slot until it reaches one that is satisfied—that is, one which matches the result obtained from the test. When it reaches one that is satisfied, it performs the actions specified in the meta-information attached to that value. If no values are satisfied and there is an OTHERWISE value at the end, the problem solver performs the actions attached to that value. If no values are satisfied and there is not an OTHERWISE value at the end, the problem solver does a "branch-to exit", meaning that the decision-node sequence failed to confirm any failure-modes and control returns to the failure-mode that led into the decision-node sequence.

If you wish to branch to a particular decision-node regardless of the result of the test, put only one value, OTHERWISE, in the RESULT-ACTIONS slot, and attach branching meta-information to that value.

A user input of unknown is treated as a special case. UNKNOWN, by definition, is satisfied only by the result-spec's UNKNOWN and OTHERWISE. So, for example, a result-spec of (NOT-EQ PASS) is not satisfied by an input of UNKNOWN.

Here are some examples of some different RESULT-ACTIONS values. Following the examples is a table of four different inputs, and what the result would be for each of these RESULT-ACTIONS values.

EXAMPLE #1:

(result-actions
   RED (:meta nil (branch-to DN-1))
   BLUE (:meta nil (branch-to DN-2)) )

EXAMPLE #2:

(result-actions
   RED (:meta nil (branch-to DN-1))
   BLUE (:meta nil (branch-to DN-2))
   OTHERWISE (:meta nil (branch-to DN-4)) )

EXAMPLE #3:

(result-actions
   RED (:meta nil (branch-to DN-1))
   BLUE (:meta nil (branch-to DN-2))
   UNKNOWN (:meta nil (branch-to DN-3)) )

EXAMPLE #4:

(result-actions
   RED (:meta nil (branch-to DN-1))
   BLUE (:meta nil (branch-to DN-2))
   UNKNOWN (:meta nil (branch-to DN-3))
   OTHERWISE (:meta nil (branch-to DN-4)) )

EXAMPLE #5:

(result-actions
   RED (:meta nil (branch-to DN-1))
   (NOT-eq red) (:meta nil (branch-to DN-2))
   UNKNOWN (:meta nil (branch-to DN-3))
   OTHERWISE (:meta nil (branch-to DN-4)) )

Now here are four different inputs, and the branch-to actions that would result for each of them, for each of the RESULT-ACTIONS values shown above:

| user input | ex. #1 | ex. #2 | ex. #3 | ex. #4 | ex. #5 |
|---|---|---|---|---|---|
| red | DN-1 | DN-1 | DN-1 | DN-1 | DN-1 |
| blue | DN-2 | DN-2 | DN-2 | DN-2 | DN-2 |
| unknown | exit | DN-4 | DN-3 | DN-3 | DN-3 |
| polka-dot | exit | DN-4 | exit | DN-4 | DN-2 |

Attached to each value in the RESULT-ACTIONS slot of the decision-node is meta-information describing what actions are to be taken as a result of each test result. The following is a description of the slots you can use as metainformation attached to each value in the HAS-TEST slot of a decision-node.

BRANCH-TO—specifies the schema to which control is transferred when the value matches the test result (or if the value is OTHERWISE and no other values are matched). The value for this slot may be a decision-node, a failure-mode, or one of the special values EXIT, INCONSISTENCY, or DEAD-END. The action depends on the value as follows:

If the value is a decision-node, then control of the diagnostic problem solver moves to the named decision-node just like following a GOTO statement in a conventional programming language.

If the value is a failure-mode, then the diagnostic problem solver attempts to diagnose the named failure-mode immediately. This means that the failure-mode is at least suspected. If the failure-mode has not already been confirmed, the problem solver first attempts to determine whether the failure-mode has occurred before looking for its causes. If you know that the test information is already sufficient to conclude that the failure-mode has occurred then use the CONFIRM slot below to assert that the failure-mode has occurred.

If the value is EXIT, INCONSISTENCY, or DEAD-END, control of the diagnosis will return to the failure-mode which most recently directed the problem solver to a branch point. The next item in the DUE-TO slot of that failure-mode will then be examined. Currently, all three of these special values have the same meaning to the diagnostic problem solver. Three different values are suggested to allow the knowledge engineer to distinguish the following three cases:

1. EXIT—the problem solver should exit the current series of branch points and return to a failure-mode without prejudice, meaning that this is a normal exit from a series of branch points with no problem suspected.

2. DEAD-END—the knowledge engineer suspects that the series of test results which leads to the satisfction of this branch point could occur in practice but represents a missing piece of knowledge in the knowledge base. For example, this value might be used if a straightforward conversion of the pinpoint tests as currently documented points out areas where research is needed to provide more complete diagnostic knowledge.

3. INCONSISTENCY—the knowledge engineer believes that the series of test results which leads to the satisfaction of this branch point should not occur in practice but if it does occur, represents an error in the external input to the diagnostic system. The nature of the suspected inconsistency should be described in the meta schema for the decision-node.

CONFIRM—optionally contains one or more failure-modes. These failure-modes are confirmed when the value matches the test result, or if the value is OTHERWISE and no other values are matched.

DISCONFIRM—optionally contains one or more failure-modes. These failure-modes are disconfirmed when the value matches the test result, or if the value is OTHERWISE and no other values are matched.

CONFIRM-AND-BRANCH-TO—optionally contains one failure-mode. This is equivalent to CONFIRM followed by BRANCH-TO, with both specifying the same failure-mode.

CONFIRM-RULES—optionally contains one or more rules which, if they fire, modify the contents of the CONFIRM meta-slot.

DISCONFIRM-RULES—optionally contains one or more rules which, if they fire, modify the contents of the DISCONFIRM meta-slot.

BRANCH-TO-RULES—optionally contains one or more rules which, if they fire, modify the contents of the BRANCH-TO meta-slot.

CONFIRM-AND-BRANCH-TO-RULES—optionally contains one or more rules which if they fire, modify the contents of the CONFIRM-AND-BRANCH-TO meta-slot.

A.7 Datum (Tests and Questions)

A single type of schema, datum, is used to represent all the methods for acquiring information from the outside world. Specific methods for acquiring information are tests and questions, both of which are instances of datum. Thus, a knowledge engineer will create test schemata and question schemata, but never datum schemata per se. However, we will talk about datum schemata in this section since it is a generic way to refer to both tests and questions.

A datum schema defines the test o question that is given to the user, and the possible results but does not define what results of the test or question is considered confirming or disconfirming evidence for an, particular failure-mode. This information is stored within the failure-mode, as meta-information on values in the failure-mode schema's HAS-TESTS slot as described above.

The following is a simple example of a test called T-1, which is used to confirm a failure-mode FM-1:

```
(defschema FM-1 :parallel
    (instance failure-mode)
    (has-tests T-1
      (:meta nil
        (confirming-results (>10))) ... )
(defschema T-1 parallel
    (instance test)
    (possible-results (in-range 0 INF))
    (results 20) ... )
```

The result of test T-1 is 20, which satisfies the "(>10)" threshold in the CONFIRMING-RESULTS meta-slot of FM-1, thus confirming the failure-mode.

If a test has an in-range expression in its POSSIBLE-RESULTS slot, then at kb-init time. an init routine examines every datum which expects a numeric result, and looks at all failure-modes and rules which use those results. By considering the bounds on the POSSIBLE-RESULTS slot and the various thresholds in the failure-modes and rules, it generates an enumerated set of intervals. These intervals are used by the user interface for generating data-entry menus, and by the planner server. For example, if a test has a POSSIBLE-RESULTS slot value of (in-range-100 100), and one failure-mode that uses that test has a CONFIRMING-RESULT value of (in-range-10 10), then the init routine generates three intervals:

−100 (inclusive) to −10 (exclusive)
−10 (inclusive) to 10 (inclusive)
10 (exclusive) to 100 (inclusive)

These intervals are automatically converted to natural-language phrases such as "−10 to 10", and are used for obtaining responses to test prompts during the run of the program.

The slots of the datum schema are:

INSTANCE—what type the schema is. This slot must contain the value DATUM.

DESCRIPTION—a brief description of the test. The value should be a vero phrase. There is no maximum length for this description value; you should usa as many characters as you need to concisely describe the failure.

POSSIBLE-RESULTS—a list of all the possible results that can be obtained from the user, or the expression:

(in-range lower-bound upper-bound) where
lower-bound and upper-bound can be any integer,
real number, or the special symbols "−INF" or "INF". Thus, a test with no range restrictions would be specified as:

(in-range -inf inf)

If the user (or a sensor) enters a value outside the range specified, the system gives an error message and prompts the user to reenter the value (even if the original value was obtained directly from a sensor). If the value is still out of range, then the problem solver considers the result to be equivalent to unknown for purposes of diagnosis. The default value is (PASS FAIL.).

POSSIBLE-RESULTS-RULES—optionally contains one or more rules which, if they fire, modify the contents of the POSSIBLE-RESULTS slot.

HAS-TESTS+INV—the inverse relation to HAS-TESTS in the failure-mode. (System generated)

HAS-STEPS+INV—the inverse relation to HAS-STEPS in the test-procedure. (System generated)

PROMPT—the text string which is to be given to the user when he/she is prompted for an answer. The value should be a complete sentence ending in a period or question mark.

PRE-PROMPT—additional text which is displayed immediately before the prompt string. The intended use for this slot is for additional information that is needed to run a test, but does not really constitute a prompt.

HOW—one or more text strings, which together describe how to perform the test. This will be given to the user if he/she gives a how command and there is no pointer to other documentation.

HOW-PICTURE—a filename of a picture file, if one exists, that is documentation for this datum.

WARNING—one or more text strings, which are printed before the HOW strings are printed. These are for warning messages, and will be printed in some emphasized way (reverse video, bold, underlined, etc.).

RESULTS—used to store the results of the test or question. This slot is generally used only by the problem solver, but can be modified by rules, if desired.

RECHECK-TO-VERIFY-REPAIR—indicates whether the problem solver should force the user to redo this test to verify a repair that is recommended as a result of this test being performed. Legal values are YES and NO, the default is NO.

RESULTS-RULES—list of rule schemata which modify the RESULT slot. This is an optional slot. See Section A.11 for more information.

HAS-ALTERNATIVE-SOURCES—not to be used by the knowledge engineer, for system use only.

MULTIPLE-VALUED—indicates whether the user may give more than one answer to the question. For example, an under hood inspection may turn up several problems, so a question about under hood inspection would set this slot to YES. Legal values are YES or NO, the default is NO.

EXTERNAL-FUNCTION—pointer used to identify a data function schema which describes an external data gathering function.

USE-UNKNOWN—controls the use of the UNKNOWN icon. If the value is NO, then UNKNOWN is not presented to the user as a possible response to the question or test. The default value is YES.

A.8 Test-procedure

A test-procedure is a single schema that represents several tests and/or questions, each of which must be performed and proper results obtained in order to confirm or disconfirm a given failure-mode. The tests listed in the HAS-STEPS slot of a test-procedure schema are conjunctive, meaning that all of them must be performed; this is different from the meaning of HAS-TESTS in a failure-mode, which is disjunctive and any one of the tests can be performed at the discretion of the problem solver.

Note that test-procedures have similarities to both datums (tests) and failure-modes. Test-procedures are similar to a datum because they have all the same slots as a datum, plus a few of their own. But, they are similar to a failure-mode because they contain information about how to interpret test results - that is, they have CONFIRMING-RESULTS and DISCONFIRMING-RESULTS meta-values attached to each datum value in their HAS-STEPS slot. Normally, the interpretation of test results is done within a failure-mode, but here it is done within the test-procedure because it is necessary to specify the confirming and disconfirming values of each step of the test-procedure, something which is impossible to specify in the failure-mode. Thus, test-procedures are generally associated with a particular failure-mode, and are used whenever the knowledge engineer wants to specify a sequence, or conjunction, of tests.

As an example, a given failure-mode FM-A can be confirmed by either test T-A passing, or both T-B and T-C failing. This can be represented by creating a test-procedure, TP-BC, which forces both T-B and T-C to be performed, and listing both T-A and TP-BC in the HAS-TESTS slot of the failure-mode:

(defschema FM-A :parallel
  (instance failure-mode)
  (has-tests .
    T-A (:meta nil (confirming-results
      (eq pass)))
    TP-BC))
(defschema TP-BC :parallel
  (instance test-procedure)
  (has-steps
    T-B (:meta nil ((confirming-results
      (eq fail)))
    T-C (:meta nil (confirming-results
      (eq fail)))

After all the tests in the HAS-STEPS slot are performed, the problem solver sets the RESULTS slot of the test-procedure to either PASS, FAIL, or UNKNOWN, according to the following logic:

If every datum referenced in the HAS-STEPS slot satisfies its corresponding CONFIRMING-RESULTS, then the result of the entire test-procedure is YES.

If any datum referenced in the HAS-STEPS slot satisfies its corresponding DISCONFIRMING-RESULTS, then the result of the entire test-procedure is NO.

If no datum causes the test-procedure to pass, and any datum fails to satisfy its CONFIRMING-RESULTS, then the result of the entire test-procedure is UNKNOWN.

The slots in a test-procedure schema are all the slots that exist in a datum schema, plus the following:

INSTANCE—the value is TEST-PROCEDURE instead of DATUM.

DESCRIPTION—a brief description of the overall meaning of the sequence of tests in the test-procedure, such as "TEST CIRCUITS X, Y, AND Z". There is no maximum length for this description value; you should use as many characters as you need to concisely describe the meaning of the test.

HAS-STEPS—the list of tests in the order they are to be performed. If any of the tests have already been performed, the result from the last time will be used— that is, they will not be performed again. If several tests are required to confirm/disconfirm a failure-mode, the problem solver will "give up" as soon as it realizes the failure-mode cannot possibly be confirmed/disconfirmed. For example, this test-procedure requires that all three tests fail in order to confirm the failure-mode:

```
(defschema FM-bad-circuit :parallel
    (instance failure-mode)
    (has-tests TP-circuit-test-ABC) )
(defschema TP-circuit-test-ABC
    :parallel
    (instance test-procedure)
    (has-steps
       T-circuit-A (:meta nil
          (confirming-results fail))
       T-circuit-B (:meta nil
          (confirming-results fail))
       T-circuit-C (:meal nil
          (confirming-results fail))
```

If T-circuit-A passes, there is no need to perform T-circuit-B or T-circuit-C since there is no way the test-procedure can succeed, so the problem solver will not ask the user to perform the last two tests.

HAS-STEPS+INV—the inverse pointer to HAS-STEPS, indicates what other testprocedures refer to this one. (System generated)

HAS-TESTS+INV—the inverse pointer to HAS-TESTS in the datum schema; it indicates which datum schema refer to this schema.

A.9 Test-family

The Test-family schema type provides a way of allowing a sequence of related tests to be grouped together so that they will be asked for together and in sequence when the diagnosis needs to run any one of the tests.

The prototype test-family schema is as follows:
```
(defschema test-family :parallel
    (description)
    (steps)
```

The tests which make up the family are any tests normally used in the knowledge base. That is, the individual tests are referenced in rules, decision-nodes, and failure-modes as appropriate. In addition, a schema is created which is an instance of TEST-FAMILY and which groups the appropriate tests by listing them in the STEPS slot. Thus, test-family schemata are used to group tests (and/or questions.) No other schema in the knowledge base ever directly refers to a test-family type schema.

An example test-family schema would appear as
```
(defschema
    TF-some-test-family :parallel
    (instance test-family)
    (description
       "Description of this test-family (a noun phrase)")
    (steps T-test1 T-test2 T-test3) )
```

When the diagnostic problem solver first needs to get the results of one of the tests in a particular test-family, the problem solver asks (in sequence) for the results of all of those tests in the family which appear to be relevant to the current state of the diagnosis.

The decision about whether a test is relevant to the current diagnosis is based on the concept of a causal shadow. The causal shadow is the causal hierarchy of failure modes, decision nodes, and other schemata which can be reached by moving downward via due-to and branch-to links. We are interested in all tests needed by these decision-nodes and failure-modes either directly or through attached rules. When a test-family test result is needed, the root of the causal shadow is determined by moving up the causal hierarchy to the first failure-mode which is known to occur and using that known failure-mode as the root of the causal shadow. The problem solver then asks for the results of all tests which are both included in the causal shadow and in the given test family. The sequence of the tests is determined by the STEPS slot of the test-family.

Computation of these causal shadows is too slow to do at run time, so it is done once for the entire knowledge base during initialization with the function TEST-KB-INIT.

The slots in a test-family schema are the following:

INSTANCE—what type the schema is. This slot must contain the value TEST-FAMILY.

DESCRIPTION—a brief description of the overall meaning of the test family, such as "SCOPE TEST". There is no maximum length for this description value; you should use as many characters as you need to concisely describe the test family.

STEPS—a list of one or more test schema names. The order of the names is important, it is used by the problem solver to determine the order that the user is instructed to perform the various tests within the causal shadow.

STEPS RULES—Contains one or more rules which if they fire modify the contents of the STEPS Slot.

A.10 Repair-procedure

A repair-procedure is a schema which represents a method for performing a repair on the system. It is referred to in a failure-mode, and is recommended to the user if that failure-mode is confirmed.

The method for verifying a repair after it has been performed is rather complex, and is described more fully in Section II C.

The slots for repair-procedure are:

INSTANCE—what type the schema is. This slot must contain the value REPAIRPROCEDURE.

DESCRIPTION—a brief description of the meaning of the schema. The value should be a short sentence, such as "INCREASE THE PAGE CACHE". There is no maximum length for this description value; you should use as many characters as you need to concisely describe the meaning of the schema.

HOW—a description of how to perform the repair. The value is one or more strings. This is an optional slot.

HOW-PICTURE—points to a picture-format file containing instructions on how to perform the repair. The value is a string. This is an optional slot.

WARNING—a warning or caution message for the repair. The user interface will display this in some kind of highlighted way, such as, boldface or boxed test. The value is one or more strings.

USES-PARTS—a list of part schemata used to perform the repair.

IS-REPAIR-FOR—the inverse relation of HAS-REPAIRS in the failure-mode schema. This slot is not used by the knowledge engineer, it is set by the problem solver.

A.11 Rules

Rules modify the default content of the knowledge base. A rule expresses the idea that under certain conditions, the knowledge expressed in a schema should be different than the ordinary or default knowledge. Specifically, a rule is a schema that modifies the contents of a slot in another schema.

This section first discusses what a rule is and what it does, then discusses what control you have over the behavior of the rule. In general, the actions that a rule performs are defined within the rule itself, and information about the behavior of the rule is defined in meta-information in the schema that refers to the rule.

A.11.1 Where to Use a Rule

A rule is a schema which modifies a slot value in another schema. There are many different slots in a knowledge base, but only certain slots may be modified by rules. For each slot that can be modified by a rule, the knowledge base provides another slot in which to put the names of the rules that modify it. For example, the rules to modify a POSSIBLE-RESULTS slot value are named in another slot in the same schema, called POSSIBLE-RESULTS-RULES.

To use a rule to modify a slot:
1. Create a rule schema.
2. Fill in values in the rule's slots that define the conditions under which the rule fires and the actions it takes when it does fire.
3. Link the rule to the schema it modifies by putting the rule schema's name in the appropriate slot of the original schema.
4. Specify any special behavior for the rule by use of meta-slots and meta-values in the original schema, as described later in this section.

The following is a list of all the types of rules in the TEST knowledge base, along with the names of the slots they change and the kind of schema that the slots are contained in:

DUE-TO-RULES modifies the DUE-TO slot of a failure-mode. (Used to modify which failure-modes are to be considered as possible causes for a failure-mode.)

HAS-TESTS-RULES modifies the HAS-TESTS slot of a failure-mode. (Used to modify the tests that can be performed to confirm or disconfirm a failure-mode.)

OCCURS-RULES modifies the OCCURS slot of a failure-mode. (Used to directly confirm or disconfirm a failure-mode.)

RESULTS-RULES modifies the RESULTS slot of a datum. (Used to directly enter a test result, regardless of whether the test was actually performed; or to modify a test result.)

POSSIBLE-RESULTS-RULES modifies the possible-results slot of a datum. (Used to modify the possible results of a test or question.)

ALWAYS-LEADS-TO-RULES modifies the ALWAYS-LEADS-TO slot of a failure-mode. (Used to modify the causal relation between a failure-mode and those above it in the hierarchy.)

CONFIRMING-RESULTS-RULES modifies the CONFIRMING-RESULTS meta-slot attached to the HAS-TESTS slot of a failure-mode, or the CONFIRMING-RESULTS meta-slot attached to the HAS-STEPS slot of a test-procedure. (Used to modify the test result which confirms a failure-mode, for example changing the threshold for deciding when a test passes or fails. The rules are noted in the confirming-results-rules slot of the meta-schema attached to the has-rules slot in a failure-mode, or the has-steps slot of a test-procedure.)

DISCONFIRMING-RESULTS-RULES modifies the DISCONFIRMING-RESULTS meta-slot attached to the HAS-TESTS slot of a failure-mode, or the DISCONFIRMING-RESULTS meta-slot attached to the HAS-STEPS slot of a test-procedure. (Used to modify the test result which disconfirms a failure-mode, for example changing the threshold for deciding when a test passes or fails. The rules are noted in the disconfirming-result-rules slot of the meta-schema attached to the has-rules slot in a failure-mode, or the has-steps slot of a test-procedure.)

CONFIRM-RULES modifies the RESULT-ACTION meta-slot attached to the CONFIRM slot of a decision-node. (Used to modify the failure-modes confirmed by the actions of a decision-node.)

DISCONFIRM-RULES modifies the RESULT-ACTION meta-slot attached to the DISCONFIRM slot of a decision-node. (Used to modify the failure-modes disconfirmed by the actions of a decision-node.)

BRANCH-TO-RULES in result-action meta-schema modifies the BRANCH-TO slot of a decision-node. (Used to modify the failure-mode branched to from a decision-node.)

CONFIRM-AND-BRANCH-TO-RULES in result-action meta-schema the CONFIRM-AND-BRANCH-TO slot of a decision-node. (Used to modify the failure-mode confirmed by and branched to from a decision-node.)

HAS-REPAIRS RULES—modifies the HAS-REPAIRS slot of a failure mode.

STEPS-RULES—modifies the STEPS slot of a Test family.

A.11.2 What a Rule Does

A rule can modify a slot value in three ways; it can replace the slot value with an entirely new value, it can reorder the existing values in a new sequence, or it can remove certain values from a slot.

Not all kinds of rules can be used to modify all slots, however. Some of them would make no sense, such as removing elements from a single-element slot such as OCCURS, or reordering a non-ordered list such as ALWAYS-LEADS-TO.

The following chart lists all the slots that can be modified by rules, and shows whether you can replace, reorder, or remove values from each kind of slot.

| slot to modify | OK to use replace-rule? | OK to use reorder-rule? | OK to use remove-rule? |
|---|---|---|---|
| due-to | yes | yes | yes |
| has-tests | no | yes | yes |
| occurs | yes | no | no |
| result | yes | no | no |
| possible-results | yes | yes | yes |
| always-leads-to | no | no | yes |
| confirming-results | yes | no | no |
| disconfirming-results | yes | no | no |
| confirm | yes | yes | yes |
| disconfirm | yes | yes | yes |
| branch-to | yes | no | no |
| confirm-and-branch-to | yes | no | no |
| has repairs | yes | yes | yes |
| steps | yes | yes | yes |

A.11.3 Control Over Rule Firing

You can specify several things about the behavior of a rule; under what conditions it fires (immediately, on-focus, or both); whether multiple rules which affect a single slot can all fire; whether a rule can cause the system to query the user for needed input; and whether the order of rules in a slot is significant. There are default values for these four control options, but you can override them by specifying values in the schema that uses the rule.

This is done by means of meta-slots attached to the slot that names the rule, or in some cases by meta-values attached to the individual rules named in the slot. Either or both methods can be used, depending on the degree of control that you want and what behavior attribute you want to affect. If you want to specify a behavior for all rules named in a slot, then use a meta-slot. However, if you want to specify a behavior for one particular rule in the slot, then use a meta-value.

For example, suppose there are three rules R1, R2, and R3 which modify the DUE-TO list of a failure-mode FM-A. You are concerned about whether the rules fire immediately or on-focus. The default is ON-FOCUS, so if the default value is acceptable, the rules would be attached to the DUE-TO list as follows:

```
(defschema FM-A :parallel
   (instance failure-mode)
   (due-to FM-B FM-C FM-D)
   (due-to-rules R1 R2 R3) ... )
```

If, however, you want to override the default value for WHEN-TO-FIRE for all three rules, you can do it via a meta-slot attached to the DUE-TO-RULES slot:

```
(defschema FM-A :parallel
   (instance failure-mode)
   (due-to FM-B FM-C FM-D)
   (due-to-rules R1 R2 R3) ... )
      (:meta nil (when-to-fire immediate)) ... )
```

The rule behavior slots, which control the use of rules are described below:

WHEN-TO-FIRE: rules are said to fire whenever all their conditions are satisfied. You can specify which firing strategy is to be used, that is, whether rules are allowed to fire immediately, as soon as their conditions are satisfied, or on-focus, only when the problem solver needs values from the slot affected by the rule. You can specify this information in meta-slots attached to the slot that the rule modifies (not in meta-values). Legal values are IMMEDIATE, ON-FOCUS, and BOTH. The default value is ON-FOCUS.

The following example shows how you can override the default value, and force the problem solver to fire a rule immediately (as soon as its conditions are satisfied):

```
(defschema T-excessive-paging :parallel
   (instance test)
   (possible-results YES NO)
   (possible-results-rules
      R-intermediate-paging)
         (:meta nil
            (when-to-fire immediate)) ... )
```

Note: the value of WHEN-TO-FIRE affects what can appear in the IF slot of the rule.

MULTIPLE-RULES-CAN-FIRE: controls whether only one or multiple rules in a list can fire. This information is specified in meta-slots attached to the slot that the rule modifies (not in meta-values). Legal values are YES, NO, IMMEDIATE-NO-ON-FOCUS-YES, and IMMEDIATE-YES-ON-FOCUS-NO. The default value is IMMEDIATE-YES-ON-FOCUS-NO.

The following example shows how to override the default value:

```
(defschema FM-AAA :parallel
   (instance failure-mode)
   due-to
      FM-BBB
      FM-CCC
      FM-DDD
   (due-to-rules
      R-modify-AAA1
      R-modify-AAA2
      R-modify-AA3)
         (:meta nil
            (multiple-rules-can-fire no))
   ... )
```

QUERY-ALLOWED: controls whether the problem solver will prompt the user for a question or test during the course of evaluating a rule. This information can be specified in meta-slots, and in meta-values attached to the slot that the rule modifies. Legal values are YES, NO, IMMEDIATE-NO-ON-FOCUS-YES, and IMMEDIATE-NO-ON-FOCU-NO. YES means "ask if needed". NO means "don't ask if the rule is immediate, but ask if the rule is on-focus". And IMMEDIATE-YES-ON-FOCUS-NO means "ask if the rule is immediate, but not if it is on-focus". The default value is IMMEDIATE-NO-ON-FOCUS-YES.

A.11.4. Details of the Rule Schema

The slots of the rule schema are:

INSTANCE—what type the schema is. This slot must contain either the value REPLACE-RULE, REMOVE-RULE, or REORDER-RULE.

IF—followed by an expression of one or more triples, where each triple is a list containing a schema name, a slot name, and a value. The expression consists of a single triple or of one or more triples combined in a Lisp-like logical expression using AND, OR, and NOT. For the rule to fire, the truth value of each triple must satisfy the overall logical expression. The truth value of each triple is determined by whether each schema named has the specified value in the specified slot. The value does not have to be specified.

Note: the (schema slot value) triples in a rule may not, in general, refer to any arbitrary schema and slot in the knowledge base. These triples may refer to any slot which is under control of the reason maintenance mechanism. Currently, this means that immediate rules can only refer to two slots: OCCURS and RESULTS. It is an error for an immediate rule to refer to any other kind of slot in its IF slot. On-focus rules can refer to any slot that can be modified by rules.

In the case of disjunction (that is, an "or" relationship between two or more conditions in a rule), the problem solver is smart enough to avoid asking for test results if some other term in the or expression is known to be false. This prevents the asking of unnecessary questions.

THEN—followed by a value or value-list. The action that the rule takes depends on what kind of rule it is:

If it is a replace-rule, the current contents of the slot are replaced with the value(s) shown.

If it is a remove-rule, the values listed are removed from the slot. If any of the values do not exist in the slot, they are ignored.

If it is a reorder-rule, the values listed are moved within the slot. There are a number of ways to accomplish this. The simplest is that the values listed are moved from their current location in the slot to the beginning, in the same order as they appear in the rule. So, if only one value is shown, it is moved to the front. If several values are shown, those values are taken out of the original schema slot and moved to the front, in the same order as they appear in the rule.

AFTER—used for reorder rules only. If the rule fires, the value(s) in the THEN slot are inserted immediately after the last of the values in the AFTER slot which actually appear in the slot being reordered. This slot contains either the keyword :START or :END, or a value or list of values which are expected to be in the slot to be reordered.

BEFORE—used for reorder rules only. If the rule fires, the value(s) in the THEN slot are inserted immediately before the first of the values in the BEFORE slot which actually appear in the slot being reordered. This slot contains either the keyword :START or :END, or a value or list of values which are expected to be in the slot to be reordered.

NOTE—a string describing any special reason why this rule exists, such as a Technical Service Bulletin (TSB). If this slot has a value, the string will be printed out along with a brief message, whenever this rule fires. The message is something like "NOTE: this rule is firing because of", and alerts the user to the fact that there is a special reason for this rule to fire.

A.11.5 More on How Reorder Rules Work

Reorder rules are slightly more complicated than the other kinds of rules. In addition to the fairly simple behavior described in the last section, reorder rules give you the ability to reorder a list of elements, where the new location of certain elements is relative to the location of other elements, without the need to specify the locations of all the elements in the new list. For example, suppose you have a failure-mode FM-E which normally appears somewhere in the middle of a long DUE-TO list:

(due-to FM-A FM-B . . . FM-E . . . FM-Z)

If a particular condition (call it <condition-1>) is true, FM-E becomes a much less likely, but still a possible cause in this due-to list. We want to move FM-E to the end of the DUE-TO list. Rather than specifying the entire new list like this:

(defschema R-1A :parallel
   (instance reorder-rule)
   (if <condition-1>)
   (then FM-A FM-B . . . FM-Z FM-E))

you would like to just specify that FMEE is moved to the end. This is done by using a special rule slot called AFTER, and a keyword: END. These two features can be used in combination to specify that one or more values are to be moved to the end of a slot. So, our example simplifies to:

(defschema R-1A :parallel
   (instance reorder-rule)
   (if <condition-1>)
   (then FM-E)
   (after :end))

The interpretation of this rule is as follows:
IF <condition-1> is satisfied
AND FM-E is a value in the slot to which the rule is attached.
THEN FM-E is moved to the end of the slot.

You have the option to insert reordered values at the end of the list or immediately before or after another specified value or subset of values. This is done via optional slots called BEFORE and AFTER in a reorder rule. These slots contain either the keyword :START or :END, or a value or list of values expected to be in the slot to be reordered.

If you are using the BEFORE slot, the value(s) in the THEN slot are inserted immediately before the first of the values in the BEFORE slot which actually appear in the slot being reordered. Similarly, if you are using the AFTER slot, the value(s) in the THEN slot are inserted immediately after the last of the values in the AFTER slot which actually appear in the slot being reordered.

If the action implied by the rule cannot be carried out because none of the values referenced in a BEFORE, AFTER, or THEN slot exist in the slot to be reordered, then no action is taken by the rule. Of course, a reorder rule never adds new values.

If neither the before or after slots are used, then a reorder rule continues to work exactly the same as the other rule types; in other words, the value of the THEN slot is used as the new value for the slot being reordered.

Here are some examples of using reorder rules.

EXAMPLE 1

The current values of a slot are:

A B C D

To move C before B, use this rule:
(defschema R-1 :parallel
   (instance reorder-rule)
   (if <condition-2>)
   (then C)
   (before B))

EXAMPLE 2

The current values of a slot include E, F, G, and J (in some order). When <condition-3> is satisfied, we want to move J after the last of E, F and G. Use this rule:

(defschema R-2 :parallel
   (instance reorder-rule)
   (if <condition-3>)
   (then J)
   (after E F G))

If the original contents of the slot were:

J A B C E F G L M N before firing rule R-2, then the slot will appear like this afterwards:

A B C E F G J L M N

If the original contents of the slot were:

A B C E L M J G X Y then after the rule fires we would have:

A B C E L M G J X Y

Note that rule R-2 means that we should move the value J immediately after the last of E F or G. So this slot:

ABCDEFGHIJ would look like this after the rule fires:

ABCDEFGJHI

Finally, this slot:

AEFG would be unchanged because a reorder rule never inserts a value not originally present. And this slot

ABJCD would be unchanged because none of the values E F and G are present to define a new location for value J.

EXAMPLE 3

This rule:
(defschema R-3 :parallel
 (instance reorder-rule)
 (if <condition-4>)
 (then B A C)
 (before D F))
has the effect of changing this slot:

AXYZDMNBFC to this:

XYZBACDMNF

Please note the following with regard to reorder

1. It is an error to use both of the slots BEFORE and AFTER on the same reorder-rule.

2. The BEFORE slot can contain the keyword :START or, alternatively, one or more potential or actual values of the slot being modified.

3. The AFTER slot can contain the keyword :END or, alternatively, one or more potential or actual values of the slot being modified.

4. It is an error to mix values with keywords in the BEFORE or AFTER slots or to try to use the keyword for the opposite slot.

A.12 KB-setup

There are a number of things about TEST which the knowledge engineer will want to customize for each application. These include the appearance of the TEST user interface at various points in the program, the initial questions that are asked of the user at the beginning of a session, and so on. To make customizing easier, TEST provides you with the ability to set these parameters by including a special schema called kb-setup in your knowledge base. You do not need to have a kb-setup schema in your knowledge base; if you don't have one, TEST will use default The kb-setup schema has the following slots:

STARTUP-MESSAGE—text that is displayed when the first screen comes up for a TEST session.

PROBELM-REPORTING-NAME—what the first phase of the TEST session is called. This is the stage where the user reports the concerns he/she has, and runs through the scripts.

PROBLEM-REPORTING-MESSAGE—text that is displayed when the first screen comes up within the problem reporting phase.

DIAGNOSTICS-PHASE-NAME—what the second phase of the TEST session is called. This is the stage where TEST performs its actual diagnosis and repair of the concerns reported in the first phase.

DIAGNOSTIC-PHASE-MESSAGE—text that is displayed when the first screen comes up within the diagnostics phase.

SESSIONS-QUESTIONS—this slot is used for listing questions that need to be asked only once per session, not once per diagnosis. Questions such as "WHAT IS YOUR NAME?" would fall into this category. The syntax of this slot is the same as the DIAGNOSIS-QUESTIONS slot in the concern-failure-mode schema.

DIAGNOSIS-QUESTIONS—these are questions that need to be asked once for each diagnosis within a session. Questions like "ENTER THE PROCESSOR TYPE" fall into this category. The syntax of this slot is the same as the DIAGNOSIS-QUESTIONS slot in the concern-failure-mode schema.

PROBLEM-REPORTING-METHOD—legal values are SINGLE, MULTIPLE, and NOT-USED. If the value is NOT-USED, then the program skips the problem reporting phase and goes immediately to the diagnostics phase, using the value(s) of the INITIAL-PROBLEM slot as the driving failure-mode(s) for the diagnosis. (Note: it is an error to have a value of NOT-USED for the PROBLEM-REPORTING-METHOD slot and no value for INITIAL-PROBLEM.) If the value is SINGLE, TEST only runs through the problem reporting phase once, then proceeds immediately to the diagnostic phase of the program. If the value is MULTIPLE, then the user can run through the problem reporting phase as many times as desired, adding new units/systems each time.

INITIAL-PROBLEM—this slot is ignored if the value of PROBLEM-REPORTING-METHOD is SINGLE or MULTIPLE. If the problem reporting method is NOT-USED, this slot should contain one or more failure-mode schema names, which will be forced to occur and will drive the diagnosis if the value of the default is that the slot is empty.

CONCERN-ORDER-FOR-QUESTIONS—used to determine the order in which TEST asks the questions for each concern. This is important if the user selects more than one concern: TEST needs to know what order to ask the questions that are listed in the DIAGNOSIS-QUESTIONS slot of the various concerns. It does not determine the order that the questions are asked within a given concern; that is governed by the order in which the questions are listed in that concern's DIAGNOSIS-QUESTIONS slot.

CONCERN-ORDER-FOR-INVESTIGATION—determines the order that TEST examines the customer-concerns for diagnosis, in the event that more than one concern exists. If there is no value in this slot, TEST examines concerns in essentially a random order.

VALID-SUBSYSTEMS—used by the check-kb function to validate values in the SUBSYSTEM slot of failure-modes.

BANNER-TEXT—used to store the text that is used as a banner on the screen.

ICON-END-PHASE—a dotted pair consisting of a string representing the message displayed at the end of a diagnosis, and the symbol "continue".

MSG-READY—the message displayed when the system is ready to begin a diagnosis.

MSG-PROBLEM—the message displayed at the beginning of the problems-to-diagnose list, where there is only one problem to choose.

MSG-PROBLEMS—the message displayed at the beginning of the problems-to-diagnose list, when there are more than one problem to choose form.

DIAGNOSTICS-PHASE-NAME—the name for the diagnostic phase of the TEST program.

DIAGNOSTICS-PHASE-MESSAGE—the message displayed when the program begins the diagnostics phase.

MSG-END-PHASE 1—the message displayed when the program transfers control from the service writer to the diagnostic phase.

MSG-END-PHASE 2—the message displayed when the program is finished with the diagnosis phase.

ICON-PHASE 1—an icon representing the service writer phase. This icon is shown at the beginning of a program run where the problem reporting method is MULTIPLE, and the user must choose between running a service writer session or a diagnostic session. This slot is a dotted pair, where the first element is a string and the second is a symbol.

ICON-PHASE 2—an icon representing the technician interface phase. This icon is shown at the beginning of a program run where the problem reporting method is MULTIPLE, and the user must choose between running a service writer session or a diagnostics session. This slot is a dotted pair, where the first element is a string and the second is a symbol.

MSG-QUIT-WARNING—the message displayed as a warning if the user selects the QUIT icon during a session.

A.13 Data Function

The data function scheme provides information regarding data that is to be gathered from an external source. The slots are as follows:

FUNCTION-NAME—name of function to be involved to get required data.

INPUTS—parameters to be passed to the named function.

OUTPUT-MAPPING—list of datum-schemata that output results of named function are mapped onto.

OUTPUT MESSAGE—a message to the user ascribing any setup that needs to be done.

B. Problem Solver (Diagnosis)

The basic diagnostic strategy is to perform a depth first search for the cause of a failure-mode, given an initial failure mode which is known to have occurred or suspected to have occurred. This is a backward chaining, recursive strategy in which the problem solver 20 starts with a high level failure mode representing an observed problem, examines the potential causes of this failure mode trying to find the actual causes, and in examining each of the potential causes may recursively examine the potential causes of these failure modes. This procedure continues until a low level failure mode is confirmed which accounts for the observed problem and which has a known repair or replacement procedure, or until there are no unexplored failure-modes in the knowledge based 24 which could cause the observed problem.

The overall strategy of the problem solver 20 is to execute the above on each of the top level failures discovered by te problem reporting server 18. In addition, as new failure modes are discovered during diagnosis, they are added to the list of failure-modes to be considered. This ensures that the diagnosis does not stop until all failure-modes are either accounted for or are analyzed as completely as possible.

In examining each failure-mode the problem solver goes through the following steps:

1. Try to determine whether the failure mode has occurred. This requires no action if the failure-mode is already confirmed or disconfirmed.

2. If the failure-mode has occurred, or we are just not sure, try to verify a potential cause of the failure mode. If a failure mode has been confirmed via forward chaining that is deeper in the causal network, the search may be refocused there.

Step 1 above can include the following smaller steps:

EVALUATE-WITH-TESTS—determine if the failure can be confirmed or disconfirmed based on direct evidence as specified in the HAS-TESTS slot. The HAS-TESTS slot is a relation which contains links to datum schemata. Datum schemata are used to represent questions and tests. The execution of this step causes the interpreter to prompt the user for information about the answers to questions and test results as needed unless the information is already available in the RESULTS slot of the appropriate datum schemata.

EVALUATE-WITH-RULES—determine if the failure-mode can be confirmed or disconfirmed by backward chaining rules specified in the occurs-rules slot of the failure mode.

CONFIRM-VIA-ELIMINATION—if all siblings of a failue mode can be disconfirmed, then that failure mode may be confirmed.

Unless the failure-mode is rejected, the problem solver then moves on to Step 2 and determines the cause of that failure-mode. It then recursively examines the failure-modes in that failure-mode's DUE-TO list.

As mentioned above, the problem solver 20 uses a combination of backward chaining to drive the diagnosis by requesting test results and forward chaining to reach conclusions about the occurrence of failure-modes as soon as relevant data become available. During forward chaining, a list of failure modes that were confirmed is generated. From that list of failure modes, a subset of failure modes causally related to the failure mode under focus is generated. From that subset, a failure mode deeper within the hierarchical structure may be made the subject of a new focus without requiring the problem solver to specifically focus on any intermediate modes. This combination tends to minimize the search (and therefore the number of tests requested) by making the maximum use of information already known to the system before requesting more information.

Forward chaining is done when a failure mode is confirmed or disconfirmed, when the RESULTS slot of a datum is modified, and whenever a change in the knowledge base triggers a rule. Whenever value(s) are stored in the RESULTS slot of a datum schema, all the failure-modes which reference that datum directly or indirectly through their HAS-TESTS slot are examined to see if they can be accepted or rejected based on currently available evidence.

Whenever a value of YES is stored in the OCCURS slot of a failure-mode, the failure-modes in its ALWAYS-LEADS-TO slot are also confirmed. Whenever a value of NO is stored in the OCCURS slot of a failure-mode, the failure modes in its ALWAYS-LEADS-TO+INV slot are also rejected.

B.1 Decision Nodes

The implementation of decision nodes is straightforward. Each decision node specifies a test, and the result is matched with values in the RESULT-ACTION slot of the decision node schema. Each of these values has meta-information attached, which may specify failure mode(s) to confirm or disconfirm, and a failure mode to confirm and begin investigating (confirm-and branch-to) or a link (BRANCH-TO). The links may specify another decision node, or one of the special values "EXIT," "DEAD-END," or "INCONSISTENCY." For each decision node, the system executes the test, and compares the result to the list in the RESULT-ACTIONS slot. If one of the special values is encountered, the diagnosis returns to the failure mode from which the sequence was entered with no effect. Otherwise the meta-information specified in the link is evaluated.

C. Repair

One purpose of the present invention is to provide a shell which can be used to construct an expert system for guiding the user in identifying failures down to a repairable level, to repair the failures identified, and to verify whether the repair has been successful. When multiple problems are present, this process may be repeated as needed. This section describes the implementation of the TEST Repair strategy and its relationship to diagnosis.

The following terminology is used through out this discussion of the repair strategy:

Top Level Problems. Those failure-modes reported by the user, represented internally as concern-failure-modes.

Current Problem. A failure-mode used as a starting point for diagnosis. Diagnosis can be started at either a top level problem or an incidental failure-mode.

Leaf Failure-Mode. A failure-mode which has nothing in its due-to slot. Such a failure-mode is a termination point of the diagnostic search through the knowledge base and typically should be a component level failure which can be repaired.

Causal Chain. The object of the problem solver is to trace a path through the due-to links from the top level problem being investigated down to a confirmed leaf failure-mode which is believed to be a primary cause of the problem. When such a path is completed, it is referred to as the causal chain. Construction of a causal chain is considered a successful termination of the diagnosis, at which point the repair strategy is invoked.

Incidental Failure-Mode. A failure-mode which is confirmed during problem reporting, diagnosis, or the repair strategy but is not on the causal chain for the most recent diagnosis. Such failure-modes are added to the problems-to-diagnose queue to use as new starting points for diagnosis.

C.1 Relationship Between Diagnosis and Repair

Figure 4:
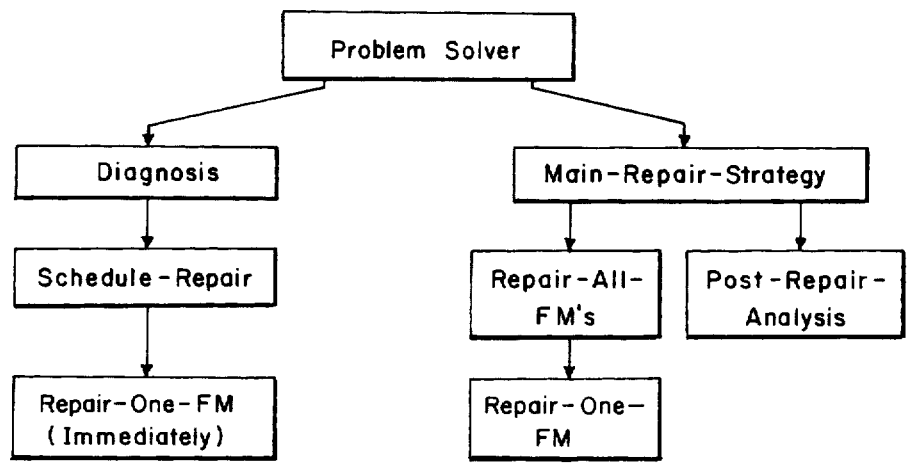
FIG. 4 illustrates, in a simplified manner, how the repair strategy fits into the TEST architecture.

FIG. 4 provides a simplified overview of how the repair strategy fits into the TEST architecture. Repair is performed by modules that are part of the problem solver. Within the problem solver, control alternates between the diagnosis functions described in the preceeding Section IIB and the repair strategy described in this section. The problem solver's goal management function passes control back and forth between diagnosis and the main repair strategy.

The order in which top level problems and incidental failure-modes are diagnosed is controlled by the problem solver queue problems-to-diagnose. The problems-to-diagnose queue initially contains the top level problems reported prior to the start of diagnosis. The initial order of problems in this queue can be controlled through the concern-order-for-investigation slot in the kb-setup schema.

Figure 5:
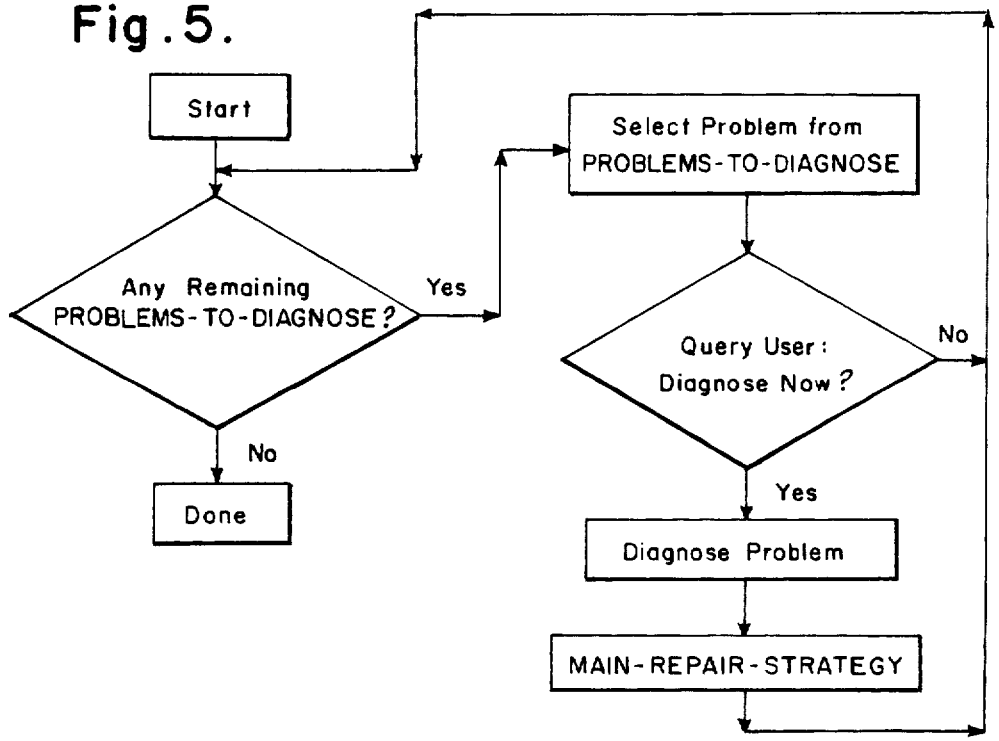
FIG. 5 is a flowchart showing how the problem-to-diagnose queue is used to determine what to diagnose.

The flowchart of FIG. 5 shows how the problems-to-diagnose queue is used in deciding what to diagnose. The problem solver selects a failure mode from the problems-to-diagnose queue and gives the user the following choices.

1. Diagnose the problem now.
2. Postpone consideration of the problem (which moves it to the end of the queue).
3. Eliminate the problem from further consideration.

The problems in the queue are presented sequentially until the user selects one of them to diagnose. The diagnosis then proceeds until completed and the repair is initiated.

As additional failure-modes are discovered during diagnosis and repair, if these failure-modes are not directly relevant to the current part of the diagnosis (incidental failure-modes), they are accumulated and added to the problems-to-diagnose queue. This allows these failure-modes to be remembered and diagnosed later, if the user desires. Failure-modes can be added either to the front or to the end of the queue as determined by the post repair analysis.

C.2 Repair Implementation

C.2.1 Repair Modules

The following are the primary modules in TEST which implement the repair strategy.

Main-repair-strategy. Called when the diagnostic problem solver reaches a point at which a causal chain has been constructed from a leaf failure-mode back up to the current problem being diagnosed. This module consists exactly of the two steps repair-all-failure-modes and post-repair-analysis.

Repair-all-failure-modes. Directs the user in repairing all confirmed failure-modes on the causal chain. Calls repair-one-failure-mode repeatedly as needed.

Repair-one-failure-mode. Guides the user in attempting to repair a particular failure-mode. After the user indicates that the repair has been made, this module attempts to verify the success of the repair by using direct tests and/or indirect tests implied by meta information on the failure-mode.

Post-repair-analysis. Determines whether the entire repair process has succeeded in fixing the current problem, has failed due to inability to perform repairs, or whether additional effort is needed in the form of repeating repairs of continuing diagnosis.

FIG. 4 illustrates how the modules of the repair strategy fit together.

During diagnosis, whenever a failure-mode is confirmed, the schedule-repair module is called. This module decides whether to call repair-one-failure-mode to accomplish the repair immediately.

The module main-repair-strategy calls the two modules repair-all-failure-modes and post-repair-analysis in sequence. Repair-all-failure-modes calls repair-one-failure-mode for each confirmed failure-mode on the previously mentioned causal chain needing repair.

C.2.2. Description of Repair Modules

The main-repair-strategy module is called when the diagnostic problem solver reaches a point at which a causal chain has been constructed from a leaf failure-mode back up to the current problem being diagnosed. This module may also be called (with the user's concurrence) when the diagnosis reaches a dead end. A diagnostic dead end is defined as confirming a non-leaf failure-mode on a causal chain back up to the problem being diagnosed, but being unable to confirm any lower-level failure-modes as the cause of the current failure-mode.

The repair-all-failure-modes module directs the user in repairing all confirmed failure-modes on the causal chain. Repair-one-failure-mode is called for each confirmed failure mode on the causal chain which has a repair provided that the failure-mode has not already been repaired. A failure-mode is considered to have already been repaired if any of the repair-procedures in its has-repairs slot have already been successfully performed. For multiple repairs, this process starts with the lowest level failure and works back up the causal chain toward the top level problem. The information about which repairs have been made only persists through one invocation of the main-repair-strategy. That is, past repairs already made are not remembered after we drop back into diagnosis.

The repair-one-failure-mode module guides the user in attempting to repair a particular failure-mode. After the user indicates that the repair has been made, this module attempts to verify the success of the repair by using direct tests and/or indirect tests implied by meta information on the on the failure-mode.

This module carries out the following steps in sequence (when applicable):

1. DO-ONE-REPAIR. Select the first (or next) repair-procedure from the has-repairs slot of the failure-mode and tell the user to do it. The user response indicates whether the repair has been done. If the user cannot perform the repair, repeat this step until a repair is done or we run out of repair-procedures. If the user cannot perform any repair, go to step 4 (and fail).

2. DIRECTLY-CONFIRM-REPAIR. If the failure-mode we are attempting to repair has a direct-test and the slot must-confirm-repair in the failure-mode has the value YES, then tell the user to run this test to confirm the repair. If the test fails, tell the user to check and if needed redo the same repair-procedure. If the test fails again, go to step 4 (and fail).

3. VERIFY-REPAIR-ATS. If the failure-mode is a leaf in the causal hierarchy and failure-modes have been specified in the verify-repair-at slot associated with the repair performed, then the direct test associated with these failure-modes is performed. Each time a verify-repair-at test fails, the failure-modes (if any) in the corresponding if-fail-then-confirm slot are confirmed.

4. DETERMINE-REPAIR-STATUS. The status of repair for this failure-mode is determined as follows:

If the user can perform none of the repair-procedures, then status=CANNOT-PERFORM-REPAIR.

If a direct test is used and the failure-mode still occurs after repeating the repair, then status=FAILED-TEST.

If a direct test is used and passes, then status=PASS.

If a direct test is available, but is not used because must-confirm-repair is NO, then status - PASS.

If no direct test is available and verify-repair-at verification is completely successful, then status=PASS.

If no direct test is available and any verify-repair-at tests fail, then status=UNKNOWN.

If no direct test is available and verify-repair-at is not applicable, then status=UNKNOWN.

The post-repair-analysis module determines whether the entire repair process has been successful by fixing the current problem, has failed due to inability to perform repairs, or whether additional effort is needed in the form of repeating repairs or continuing diagnosis.

This module carries out the steps listed below in sequence (when applicable). However, when the current problem is an incidental failure-mode rather than a top level problem, those steps of post-repair-analysis which reference the top level problem in some way are skipped. The steps that are skipped are: recheck-top-level-problem, process-if-fail-then-confirm, redo-unverifiable-repairs and Pursue-multiple-causes.

1. CHECK-FOR-TOTAL-REPAIR-FAILURE. If all failure-mode repairs have failed, output a message indicating that we are abandoning the diagnosis of the current problem, remove the problem from the appropriate queue, and go to step 9.

2. PROCESS-VERIFY-WHEN-FINISHED. For each failure-mode in the causal chain that has been confirmed, if the failure-mode has the value YES in the verify-when-finished slot, then use a direct test to determine whether the failure-mode still occurs. This processing proceeds up the causal chain from the leaf failure-mode toward the initial problem which has been diagnosed.

3. RECHECK-TOP-LEVEL-PROBLEM. Prompt the user to see if the top level problem has been fixed. If so, then the diagnosis of this top level problem is terminated successfully with an appropriate message to the user. When successful, go to step 9.

4. PROCESS-IF-FAIL-THEN-CONFIRM. At this point we know the top level problem has not been corrected. Therefore any failure-modes, listed in the if-fail-then-confirm slots corresponding to the repairs which have been performed, with resulting status=FAILED-TEST, are now confirmed.

5. CHECK-FOR-ANY-REPAIR-FAILURE. At this point if any of the repairs failed, we do the following: First, abandon diagnosis of the current problem with an appropriate message to the user blaming the repair(s) that failed. The current problem is removed from the problems-to-diagnose queue. Then, go to step 9.

6. CHECK-FOR-QUEUED-FAILURE-MODES. At this point, if any incidental failure modes have been discovered during diagnosis or repair, these failure modes are added to the front of the problems-to-diagnose queue, and we go to step 9.

7. REDO-UNIVERIFIABLE-REPAIRS. If there were any repairs made which had an outcome of unknown, select the lowest one in the causal chain and redo it. Then reverify the top level problem. If the top level problem is fixed, remove the problem from the problems-to-diagnose queue, and go to step 9. If the top level problem is not fixed, repeat this step until there are no more unknown repairs. Then go to step 9. If the top level problem is still not fixed, it remains in the queue to be rediagnosed.

8. PURSUE-MULTIPLE-CAUSES. If we get this far without exiting, determine if any confirmed failure-modes in the causal chain expect multiple causes, have a direct test, and have an unexplored alternative cause. If so, pick the lowest such failure-mode and verify whether it still occurs with the direct test. Repeat with the next higher such failure-mode until a failure-mode is reconfirmed or there are no more possibilities. When such a failure-mode with multiple causes is reconfirmed, place it on the front of the problems-to diagnose queue. This action has the effect of making this failure-mode with potential multiple causes the next candidate for diagnosis. Go to step 9.

9. POST-REPAIR-FINISHED. At this point we are ready to switch back to diagnosis. First, however, we want to clear all evidence (retract beliefs) gathered before the last repair because some of this evidence may be symtomatic of failures which have now been repaired. In the current implementation, all beliefs, including those established by the last repair, are retracted; however this is not the desired behavior.

C.3. Determining Repair Results

The following algorithm enables the problem solver to determine, given a repair-procedure R1 for a failure-mode F1, which of the five possible outcomes has occurred. This algorithm does not consider the problem of multiple repair-procedures for a single failure-mode, or more than one failure-mode requiring repair; that is discussed in a later section.

Validate-a-repair Algorithm:
tell user to perform repair procedure R1;
If there is a direct test T1 for F1 THEN
BEGIN
  tell user to perform test T1;
  IF T1 fails
    THEN conclude Case-3
    ELSE
      BEGIN
        ask user whether current concern
          C1 is now fixed;
        IF C1 is fixed
          THEN conclude Case-1
          ELSE conclude Case-2
      END
END
ELSE {no direct test for F1}
BEGIN
  ask user whether current concern C1
    is now fixed;
  IF C1 is fixed
    THEN conclude Case-4
    ELSE conclude Case-5
END
END.

C.4 Default Behavior

Below are brief descriptions of different cases, and how the problem solver handles each case, in the absence of any instructions in the knowledge base to alter the default behavior:

Case-1—Repair R1 is known to fix both F1 and C1. This is a successful repair, the situation that is assumed in most simple expert system models.

Default behavior for case-1: none, the diagnosis is finished. Check if any other concerns were also fixed, and if so, remove them from the queue. Go on to the next outstanding concern.

Case-2—R1 is known to fix F1, but doesn't fix the current concern C1. This probably occurred because there were other co-occuring problems besides F1 which caused C1. However, it is also possible that there is faulty evidence for F1 and/or C1, or there is an error in the knowledge base. We will make a working assumption that there are other causes for C1 that need to be diagnosed and fixed, so the problem can be anywhere in the causal chain from C1 down to the failure-mode above F1. The problem solver will ask user to test any failure-modes in the causal-chain which have their EXPECT-MULTIPLE-CAUSES slot set to YES. If no problem is found with any of those, the diagnosis is restarted from C1. If no problems are found anywhere in the causal chain, an error in the knowledge base or faulty evidence is concluded.

Default behavior for case-2: clear all confirming evidence from the knowledge base except the evidence that F1 is fixed. Perform direct tests on all failure-modes in the causal chain which have EXPECT-MULTIPLE-CAUSES set to yes (starting at the bottom and working up the chain), and restart the diagnosis at any of them which fail their direct tests. If none fail their direct tests, restart the diagnosis at the original concern C1.

Case-3—R1 does not fix F1. This can be due to the technician performing a wrong procedure (that is, he/she did not really do R1), or the technician performed the correct procedure but the part used was bad, or there is a knowledge base error and R1 is the wrong repair for F1.

Default behavior for case-3,: instruct the technician to check to make sure the replacement parts were good, that they were the proper parts called for by the repair-procedure, and that they were installed correctly; if necessary, redo the repair.

If F1 still isn't fixed, then conclude that there is an error in the knowledge base (either the wrong repair for F1 or the wrong method for confirming F1); ask the user to enter a mail message if desired, and stop.

Case-4—There is no direct test for F1, but R1 fixes C1. Here, the system concluded F1 for some reason other than a direct test (perhaps by a rule-out strategy), and it is impossible to directly test F1 after the repair. Since C1 is fixed, however, we can safely infer that F1 must have been fixed also, so it is not necessary to look for additional tests, e.g., test other failure-modes on the causal chain between C1 and F1.

Default behavior for case-4: none, the diagnosis is finished. Go on to the next outstanding concern.

Case-5—There is no direct test for F1, and C1 is not fixed by R1. In this case, the repair failed to fix the original problem, but there is no way to tell if the repair actually fixed F1. Possibly the repair fixed something other than F1 which was the cause for other concerns, or possibly the repair did fix F1 but F1 was not the cause of C1, or if there are additional co-occuring failures that also contributed to C1. First, we see if there was a problem with the repair, by doing it again. Then, if the concern C1 is still not fixed, we restart the diagnosis for C1. (Note that since we cannot assume F1 is fixed, there is really no way to prune the search for the failure point within the causal chain, thus we must restart the diagnosis at C1.)

Default behavior for case-5: instruct user to redo the repair and check C1. If fixed, then we are done. Otherwise, clear all confirming evidence from the knowledge base and restart the diagnosis at C1, and for each failure-mode which was a direct test, ask the technician to reperform that test. Continue backing up through the causal chain until we reach a failure-mode that fails its direct test. At that point, restart the diagnosis at the failure-mode whose direct test failed.

C.5 Modifying Default Behavior

The default repair strategy described above can be modified as needed by the knowledge engineer, by attaching certain meta-information to value in the HAS-REPAIRS slot of a failure-mode. Those modification methods are described below:

VERIFY-WHEN-FINISHED: a failure-mode slot indicating whether this failure-mode should be rechecked after it has been confirmed and the problem solver comes to a diagnostic conclusion which includes it in the causal chain. This slot is used primarily for quick-test failures, where virtually all repairs, which are made as a result of a quick-test code, call for a re-running of the quick-tests afterwards to verify the repair. Legal values are YES and NO; the default value is NO.

VERIFY-REPAIR-AT: an ordered list of failure-modes, indicating which failure-modes must be rechecked and disconfirmed after the repair. If any of the failure-modes are confirmed, they become the new diagnostic focus. The slot is specified in a meta-value attached to values in the HAS-REPAIRS slot of a failure-mode.

Effect: this effects Case-1, Case-2, and Case-3, where the immediate failure-mode F1 has a direct test and passes. The default strategy is to check the customer-concern C1, using the VERIFY-REPAIR-AT slot causing the problem solver to first check each of the failure-modes listed before checking C1. If there is a failure-mode fn in the VERIFY-REPAIR-AT list which is found to be bad, the problem solver clears all evidence from the knowledge base, except the evidence that was obtained after the repair was performed, and restarts the diagnosis at fn.

IF-FAIL-THEN-CONFIRM: a non-order list of failure-modes which are automatically confirmed if the repair does not fix the failure-mode to which it is attached. The slot is attached to values in the HAS-REPAIRS slot of a failure-mode, or to values in the VERIFY-REPAIR-AT slot in the meta-value-slot described above.

Effect: the effect is different depending on where the IF-FAIL-THEN-CONFIRM slot is attached. If it is attached to a value in the HAS-REPAIRS slot, then confirm the specified failure if the repair solves the immediate failure F1, but does not solve the original customer-concern C1. If, however, it is attached to a value FN in the VERIFY-REPAIR-AT meta-slot, then confirm the specified failure if FN is found to be bad during the course of verifying the repair.

PERFORM-REPAIRS-IMMEDIATELY: Controls whether a repair-procedure is to be performed immediately, upon confirmation of the failure-mode it is attached to, or whether the repair-procedure s wait until the problem solver gets to a leaf mode. Legal values are YES and NO; the default is NO. This is a slot in the failure-mode schema.

INVALIDATE-DISCONFIRMED-FMS: controls whether the belief that certain failure-modes that are disconfirmed should be retained or deleted after a repair is performed. The default behavior is that after a repair, all confirmed failure-modes have their OCCURS slot value changed from YES to UNKNOWN, and all disconfirmed failure-modes have their OCCURS slot value left unchanged at NO. The INVALIDATE-DISCONFIRMED-FMS slot enables you to specify one or more failure-modes for which the OCCURS slot is forced from NO to UNKNOWN after a repair. This is a slot in the repair-procedure schema.

MUST-CONFIRM-REPAIR: controls whether it is necessary to confirm a repair by performing a direct test. Legal values are YES and NO; the default is YES. The value can be explicitly set to NO in situations where the repair always succeeds and a test would be unnecessary, or where the direct test is especially expensive and not worth doing in most cases. This is a slot in the failure-mode schema.

C.6 Multiple Repair-Procedures

There are two situations where the system needs to select from a number of repair-procedures that one that should be performed first:

1. There are two or more repair-procedures associated with a given failure-mode.
2. There are two or more failure-modes confirmed which have repair-procedures associated with them.

To handle the first situation where there are multiple repair-procedures associated with the same failure-mode, we simply assume that the repair-procedures are ordered from most to least desirable and that the default behavior is to choose the first one on the list. If the repair cannot be performed (because of missing parts, tools, or know-how) then the problem solver moves to the next repair(s) on the list.

Measures of desirability can be added (cost and "goodness of fix") to an algorithm for weighing the different measures, but a simple ordering maybe sufficient.

To handle the second situation where there are multiple failure-modes which are confirmed and have repair-procedures, the default strategy is that when we confirm a failure-mode which is not a leaf node, we defer performing its repair-procedures until the diagnosis has proceeded all the way to a leaf node.

The knowledge engineer can overrule this strategy by means of the PERFORM-REPAIRS-IMMEDIATELY slot in the failure-mode. This slot, if set to YES, causes the system to immediately select a repair-procedure from the HAS-REPAIRS list and perform the repair.

D. Other Servers

D.1 Plan

The plan server gives the problem solver the ability to incrementally generate decision trees from the current state of the diagnosis. Plan shows the next series of tests the technician must perform, based on all possible results for those tests. It can display the results either in tabular or in graphical flow-chart form.

Plan is useful for two purposes. First, if the unit under test is not in close proximity to the terminal on which the diagnostic session is taking place, plan can be used to indicate to the technician what his next few tasks should be. Second, plan can be useful for knowledge engineers validating a knowledge base, by exploring all possible paths from a given point in the knowledge base.

D.2 Explanation

TEST can provide both "why" and "how" explanations for any conclusion, question, or test performed during a diagnosis. "Why" explanations are justifications for diagnostic conclusions or requested tests, and "how" explanations are instruction on how to perform a particular test or repair. A combination of historical and evidential reasons are given in response to "why" questions. The evidential information and the historical information is collected by the problem solver throughout the diagnosis. Instructions stored in the HOW slots of test (datum) and repair-procedure schemata are the basis for "how" explanations.

The following types of why explanations may be provided:

Why a question or test is being performed.
Why a failure mode conclusion was made.
Why a failure mode is being investigated.

The explanation for a question or test gives the information which that test can be used to conclude. This consists of the failure mode which triggered the test, along with a list of the possible causes of that failure and the status of each. The failure mode which triggered the test is historical information, the possible causes and their status are beliefs.

The explanation for a failure mode conclusion gives the evidential reason for concluding the result and provides justification for this reason. Some of the major reasons are that a failure mode was disconfirmed as a result of ruling out possible causes, that a failure mode was rejected or confirmed on the basis of an always-leads-to relationship with another failure mode, or that data supplied by the user, a test, or default information in the knowledge base was used to confirm or disconfirm. If the reason is an inference based on other conclusions, then an explanation for each of these is also provided.

The explanation for why a failure mode has been investigated gives the reason that a failure mode which has not been concluded has been explored. It provides a justification for the failure mode whose investigation triggered the investigation of this failure mode, and enumerates the possible causes for the failure mode and their status. The parent failure mode is identified using historical data, and its justification is based on evidential information. The possible causes for the failure mode and their status are obtained from evidential information.

D.3. New Information

The new-info feature can be used by the technician performing the diagnosis to volunteer new information to the problem solver. In addition, new-info can be used to change the focus of the diagnosis to investigate any failure in the knowledge base. Specifically, there are four options available within new-info:

1. Volunteer a test result. This is used if the technician notices something which he feels might be useful to the system in doing its diagnosis.

2. Investigate a failure immediately. This is useful whenever the user suspects a particular cause of the top-level problem. Taking advantage of the technician's "hunches" frequently allows the diagnostic module to reach a conclusion more quickly than would be possible otherwise. The user selects a failure mode from a list of failure mode descriptions. This causes the diagnosis to investigate the subtree associated with the selected failure mode at the root.

3. Assert that a failure mode occurs. This option allows the user to assert that a particular failure has occurred, even if it is not currently the focus of the diagnosis. For example, an auto mechanic could be checking a arc radiator and notice that a fan belt is broken. The new-info feature would give him the opportunity to assert that the broken fan belt failure is occurring, without having to wait to be asked about it.

Like the second option, the user selects from a list of matching failure mode descriptions. The OCCURS slot of the selected failure mode is set to YES. Note that this option does not automatically shift the focus of the diagnosis; that is, the failure-mode which is asserted to occur is not automatically investigated right away.

4. Assert that a failure-mode occurs and investigate its causes immediately. This option is a combination of the preceding two. It is identical to "Assert that a failure-mode occurs" except that it does automatically investigate the subtree below the asserted failure-mode immediately.

D.4 Undo

The undo feature allows the user to change previously entered information. Because undo is really a subset of the capabilities of new-info, it is not necessary to describe it in depth here.

Three types of undo may be provided.

Undo. This is the generalized undo feature, which allows the user to change any previously entered test result. It operates in the same manner as the "Volunteer test result" option of new-info, except that instead of prompting the user for a search, undo displays a chronological list of questions which have already been answered along with the answers which were given. The user selects one of those and is prompted for a new result. The system will adjust its beliefs accordingly and will refocus attention if applicable.

Backup. This option reasks the previous question. It is the same as the generalized undo, except that the user doesn't have to select the question to reask. The previous question is assumed to be the one the user wants to undo.

Undo-chronological. This option allows the user to backup the diagnosis to its state at the time when any previous test was performed. Like with the generalized undo, the user is presented with a chronological list of previously answered questions. After the user selects one of these, the problem solver undoes as many questions as necessary until the specified question is reasked. This feature is especially useful to the knowledge engineer for knowledge base validation, by helping him explore all possible paths that the diagnosis can take.

E. Conclusion

While the present invention has been described in conjunction with a preferred embodiment, those of ordinary skill in the art will recognize that many functions and features can be added to the system, or removed therefrom, without impairing the function of the major components of the system. The preferred embodiment described hereinabove is provided for purposes of illustration only and is not intended to be a limitation of the present invention. It is anticipated that those of ordinary skill in the art will be capable of making many modifications and variations of the present invention. This disclosure and the following claims are intended to cover all such modifications and variations.

What we claim is:

1. An application shell providing a domain-independent diagnostic problem solver, comprising: knowledge base means including, (a) a plurality of failure mode schemata arranged in a causal hierarchy from observable failure modes to failure modes having a repair procedure;

(b) a plurality of rules related to certain of said failure mode schemata;
(c) a plurality of datum schemata for gathering data about the system under investigation, said data being used to determine the applicability of said rules; and
(d) a plurality of repair procedure schemata each being related to one of said failure mode schemata having a repair procedure; and problem solver means for searching through said failure mode schemata based on said rules and the hierarchical arrangement of said failure mode schemata in such a manner as to be able to refocus on another failure mode schema deeper within said hierarchical arrangement without fully investigating intermediate schemata to thereby locate an appropriate repair procedure schema.

2. The application shell of claim 1 additionally comprising means for generating beliefs and means for forward chaining based on said beliefs, and wherein said means for searching is capable of refocussing from one schema to another schema deeper within said hierarchical arrangement without fully investigating intermediate schemata in response to said forward chaining.

3. The application shell of claim 1 additionally comprising means for receiving user input and wherein said means for searching is capable of refocussing from a first schema to a second schema not causally related to said first schema in response to said user input.

4. The application shell of claim 3 wherein said means for searching is capable of refocussing from one schema to another schema deeper within said hierarchical arrangement without fully investigating intermediate schemata in response to said user input.

5. The application shell of claim 1 wherein said means for searching conducts a left to right depth first search.

6. The application shell of claim 5 wherein said depth first search is conducted even for failure mode schemata which are unknown.

7. The application shell of claim 1 wherein said problem solver means includes means for drawing conclusions and wherein said means for generating beliefs generates beliefs based on one of said information and said conclusions.

8. The application shell of claim 1 wherein said failure mode schemata include slots containing values, and wherein said rules are capable of modifying said values such that said knowledge base means can be dynamically modified.

9. The application shell of claim 8 wherein said rules modify said values by one of reordering said values of said slot, removing said valves from said slot and replacing said values in said slot with new values.

10. The application shell of claim 1 wherein said rules are capable of modifying said knowledge base means so as to accommodate variations in the domain.

11. The application shell of claim 8 wherein certain of said rules fire only when said slot that they modify is accessed.

12. The application shell of claim 8 wherein certain of said rules fire whenever said information needed to determine the applicability of the rules is available.

13. The application shell of claim 1 wherein certain of said datum schemata are directed to determining if a repair procedure was locally successful.

14. The application shell of claim 1 additionally comprising means for determining if said repair procedure was globally successful.

15. The application shell of claim 14 wherein certain of said failure mode schemata, intermediate of observable failure modes and failure modes having a repair procedure, which have more than one cause are identified such that upon determining that a repair procedure was locally but not globally successful, said means for searching returns to said identified failure mode schemata.

16. The application shell of claim 15 wherein said means for determining if said repair procedure was globally successful also determines if said repair procedure was intermediately successful.

17. An application shell providing a domain-independent diagnostic problem solver, comprising: knowledge base means including,
(a) a plurality of failure mode schemata arranged in a causal hierarchy from observable failure modes to failure modes having a repair procedure;
(b) a plurality of rule schemata related to certain of said failure mode schemata;
(c) a plurality of datum schemata for gathering data about the system under investigation, said information being used to determine the applicability of said rule schemata; and
(d) a plurality of repair procedure schemata each being related to one of said failure mode schemata having a repair procedure; and problem solver means for forward chaining through said knowledge has means to reach conclusions about said failure mode schemata and for backward chaining through said knowledge base means based on said rules, said conclusions, and the hierarchical arrangement of said failure mode schemata so as to change the focus from one failure mode schema to another failure mode schema deeper within the hierarchical arrangement without focusing upon any intermediate schemata to thereby locate an appropriate repair procedure schema.

18. The system of claim 17 additionally comprising means for generating beliefs about the system under investigation and wherein said forward chaining is based on said beliefs.

19. The system of claim 17 wherein said forward chaining is based on said gathered data.

20. The system of claim 17 wherein said schemata include slots containing values and wherein said plurality of rule schemata are capable of modifying said values in said slots to thereby dynamically alter said knowledge base means.

21. The system of claim 17 additionally comprising a plurality of decision mode schemata integrated within said hierarchical structure to provide conditional branching.

* * * * *

UNITED STATES PATENT AND TRADEMARK OFFICE
CERTIFICATE OF CORRECTION

PATENT NO. : 4,866,635  Page 1 of 3

DATED : September 12, 1989

INVENTOR(S) : Gary S. Kahn, Jeffrey A. Pepper, Al N. Kepner, William Richer and Rajiv Enand It is certified that error appears in the above-identified patent and that said Letters Patent is hereby corrected as shown below:

Col. 10, line 54, delete "font" and substitute therefor --front--.

Col. 19, line 27, delete "satisfction" and substitute therefor --satisfaction--.

Col. 20, line 12, delete "o" and substitute therefor --or--.

Col. 20, line 26, delete "T-1 parallel" and substitute therefor --T-1: parallel--.

Col. 20, line 59, delete "usa" and substitute therefor --use--.

Col. 21, line 19, delete "i" and substitute therefor --is--.

Col. 23, line 31, delete "testprocedures" and substitute therefor --Test-procedures--.

Col. 28, line 24, delete "IMMEDIATE-NO-ON-FOCU-NO." and substitute therefor --IMMEDIATE-NO-ON-FOCUS-NO.--.

UNITED STATES PATENT AND TRADEMARK OFFICE
CERTIFICATE OF CORRECTION

PATENT NO. : 4,866,635                                    Page 2 of 3

DATED : September 12, 1989

INVENTOR(S) :    Gary S. Kahn, Jeffrey A. Pepper, Al. N. Kepner,
                 William Richer and Rajiv Enand It is certified that error appears in the above-identified patent and that said Letters Patent is hereby corrected as shown below:

Col. 29, line 53, delete "FMEE" and substitute therefor --FM-E--.

Col. 31, line 34, after "reorder" insert --rules--.

Col. 31, line 58, after "default" insert --values--.

Col. 32, line 8, delete "SESSIONS-QUESTIONS and substitute therefor --SESSION-QUESTIONS--.

Col. 33, line 67, delete "te" and susbstitute therefor --the --.

Col. 34, line 5, after "solves" insert --20 --.

Col. 41, line 37, delete "non-order" and substitute therefor --non-ordered--.

Col. 41, line 57, delete "mode" and substitute therefor --node--.

Col. 41, line 56, delete "s" and substitute therefore--should --.

UNITED STATES PATENT AND TRADEMARK OFFICE
CERTIFICATE OF CORRECTION

PATENT NO. : 4,866,635

DATED : September 12, 1989

INVENTOR(S) : Gary S. Kahn, Jeffrey A. Papper, Al N. Kepner, William Richer and Rajiv Enand Page 3 of 3

It is certified that error appears in the above-identified patent and that said Letters Patent is hereby corrected as shown below:

Col. 43, line 67, delete "arc" and substitute therefor --car's--.

Col. 46, line 36, after "and" insert a paragragh.

Col. 46, line 38, delete "bas" and substitute therefor --base--.

Signed and Sealed this

Second Day of July, 199

Attest:

Attesting Officer

HARRY F. MANBECK, JR.

Commissioner of Patents and Trademarks

UNITED STATES PATENT AND TRADEMARK OFFICE
CERTIFICATE OF CORRECTION

PATENT NO. : 4,866,635

DATED : September 12, 1989

INVENTOR(S) : Gary S. Kahn, Jeffrey A. Pepper, Al N. Kepner, William Richer and Rajiv Enand It is certified that error appears in the above-identified patent and that said Letters Patent is hereby corrected as shown below:

Col. 1, line 59, delete "here-to-for" and substitute therefor --heretofor--.

Col. 3, line 35, delete "none-the-less" and substitute therefor --nonetheless--.

Col. 4, line 41, delete "maybe" and substitute therefor --may be--.

Col. 15, line 3, delete " after NOTE.

Col. 31, line 62, delete "PROBELM-REPORTING-NAME" and substitute therefor --PROBLEM-REPORTING-NAME--.

Col. 33, line 6, delete "form" and substitute therefor --from--.

Col. 37, line 35, delete "on the", first occurrence.

Col. 37, line 68, delete "-" after status and substitute therefor "=".

Col. 38, line 56, delete "REDO-UNIVERIFIABLE-REPAIRS" and substitute therefor --REDO-UNVERIFIABLE-REPAIRS--.

Col. 39, line 7, delete "problem-to-diagnose" and substitute therefor --problems-to-diagnose--.

Col. 39, line 15, delete "symtomatic" and substitute therefor --symptomatic--.

UNITED STATES PATENT AND TRADEMARK OFFICE
CERTIFICATE OF CORRECTION

PATENT NO. : 4,866,635

DATED : September 12, 1989

INVENTOR(S) : Gary S. Kahn, Jeffrey A. Pepper, Al. N. Kepner, William Richer and Rajiv Enand It is certified that error appears in the above-identified patent and that said Letters Patent is hereby corrected as shown below:

Col. 40, line 28, delete "case-3,:" and substitute therefor --case-3:--.

Col. 45, line 56, delete "valves" and substitute therefor --values--.

Signed and Sealed this

Tenth Day of December, 1991

Attest:

HARRY F. MANBECK, JR.

*Attesting Officer*  *Commissioner of Patents and Trademarks*